United States Patent
Agarwal et al.

(10) Patent No.: US 10,346,222 B2
(45) Date of Patent: *Jul. 9, 2019

(54) ADAPTIVE TREE STRUCTURE FOR VISUALIZING DATA

(71) Applicant: Microsoft Technology Licensing, LLC, Redmond, WA (US)

(72) Inventors: Mayank Agarwal, Redmond, WA (US); Alexander Dadiomov, Redmond, WA (US); Xinhua Ji, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/089,384

(22) Filed: Nov. 25, 2013

(65) Prior Publication Data

US 2014/0089945 A1 Mar. 27, 2014

Related U.S. Application Data

(63) Continuation of application No. 12/956,127, filed on Nov. 30, 2010, now Pat. No. 8,595,750.

(51) Int. Cl.
  *G06F 9/54* (2006.01)
  *G06F 16/904* (2019.01)

(52) U.S. Cl.
  CPC ............ *G06F 9/542* (2013.01); *G06F 16/904* (2019.01)

(58) Field of Classification Search
  CPC ....................................................... G06F 9/542
  See application file for complete search history.

(56) References Cited

U.S. PATENT DOCUMENTS

| 5,828,883 | A | 10/1998 | Hall |
| 6,651,243 | B1 | 11/2003 | Berry et al. |
| 6,769,126 | B1 | 7/2004 | Pekowski |
| 7,046,247 | B2 | 5/2006 | Hao et al. |
| 7,194,477 | B1 * | 3/2007 | Bradley et al. |

(Continued)

FOREIGN PATENT DOCUMENTS

| CN | 1991751 | 7/2007 |
| CN | 101483610 | 7/2009 |

(Continued)

OTHER PUBLICATIONS

Albers et al.; "An Event Stream Driven Approximation for the Analysis of Real-Time Systems"; Jul. 12, 2004; IEEE; 11 pages.*

(Continued)

*Primary Examiner* — Umut Onat
(74) *Attorney, Agent, or Firm* — Dicke, Billig & Czaja, PLLC

(57) ABSTRACT

One or more systems and/or techniques for generating an adaptive tree structure for storing event data based upon data density of events are disclosed. In particular, the adaptive tree structure may comprise one or more levels of nodes, where a level may correspond to a resolution of events. Nodes may correspond to particular time spans over which event data was recorded. A node may be designated as a raw node comprising raw events or a summary node comprising summary events based upon the number of events occurring within a time span covered by the node.

16 Claims, 11 Drawing Sheets

(56) References Cited

U.S. PATENT DOCUMENTS

| | | | |
|---|---|---|---|
| 7,373,473 | B2 | 5/2008 | Bukowski et al. |
| 7,386,686 | B2 | 6/2008 | Wu et al. |
| 7,519,961 | B2 | 4/2009 | Alexander, III et al. |
| 8,312,037 | B1* | 11/2012 | Bacthavachalu ..... G06F 9/5066 707/769 |
| 8,510,721 | B2 | 8/2013 | Dadiomov et al. |
| 8,595,750 | B2* | 11/2013 | Agarwal et al. ............. 719/318 |
| 8,941,657 | B2 | 1/2015 | Agarwal et al. |
| 2003/0140282 | A1* | 7/2003 | Kaler ................... G06F 11/302 714/39 |
| 2004/0168115 | A1 | 8/2004 | Bauernschmidt et al. |
| 2005/0086238 | A1 | 4/2005 | Nevin, III |
| 2005/0223080 | A1 | 10/2005 | Gray |
| 2006/0069682 | A1 | 3/2006 | Fanous et al. |
| 2006/0221077 | A1 | 10/2006 | Wright et al. |
| 2007/0083856 | A1 | 4/2007 | Chilimbi et al. |
| 2007/0245238 | A1 | 10/2007 | Fugitt et al. |
| 2008/0189717 | A1 | 8/2008 | Agarwal et al. |
| 2009/0241095 | A1 | 9/2009 | Jones et al. |
| 2009/0276714 | A1 | 11/2009 | Kandlikar et al. |
| 2010/0017168 | A1* | 1/2010 | Albers et al. ................ 702/186 |
| 2010/0017791 | A1 | 1/2010 | Finkler |
| 2010/0169853 | A1 | 7/2010 | Jain et al. |
| 2010/0194766 | A1 | 8/2010 | Nakagawa |
| 2010/0197766 | A1 | 8/2010 | Wright et al. |
| 2010/0211618 | A1 | 8/2010 | Anderson et al. |
| 2012/0054721 | A1 | 3/2012 | Dadiomov et al. |
| 2012/0137308 | A1 | 5/2012 | Agarwal et al. |
| 2012/0299965 | A1 | 11/2012 | Agarwal et al. |

FOREIGN PATENT DOCUMENTS

| | | |
|---|---|---|
| CN | 101582048 | 11/2009 |
| CN | 101763422 A | 6/2010 |
| WO | 2007053457 | 5/2007 |
| WO | 2010031945 | 3/2010 |

OTHER PUBLICATIONS

Chakraborty et al.;"A New Task Model for Streaming Applications and its Schedulability Analysis";2005;IEEE.*
1st Chinese Office action dated Nov. 18, 2013, 11 pages.
Chinese Notice of Allowance dated, Aug. 14, 2014, 6 pages.
Response to 1st Chinese Office action, dated Apr. 3, 2014, 26 pages.
"Non-Final Office Action Issued in U.S Appl. No. 12/868,495", dated Oct. 5, 2012, 15 Pages.
"Notice of Allowance Issued in U.S Appl. No. 12/868,495", dated Apr. 9, 2013, 15 Pages.
"Non-Final Office Action Issued in U.S Appl. No. 12/956,127", dated Jan. 4, 2013, 18 Pages.
"Notice of Allowance Issued in U.S Appl. No. 12/956,127", dated Jul. 19, 2013, 11 Pages.
"Non-Final Office Action Issued in U.S Appl. No. 13/113,422", dated Jun. 20, 2014, 26 Pages.
"Notice of Allowance Issued in U.S Appl. No. 13/113,422", dated Sep. 15, 2014, 10 Pages.

Yang, et al., "Multiresolution Data Aggregation and Analytical Exploration of Large Data Sets", In the International Society for Optical Engineering, Jan. 2009, 5 Pages.
Whaley, John, "A Portable Sampling-Based Profiler for Java Virtual Machines", In Proceedings of the ACM 2000 conference on Java Grande, Jun. 2000, 10 Pages.
Rivest, et al., "Toward Better Support for Spatial Decision Making: Defining the Characteristics of Spatial On-Line Analytical Processing (SOLAP)", In Geomatica-Ottawa, vol. 55, Issue 4, Dec. 2001, pp. 539-555.
Rhodes, et al., "Iteration Aware Prefetching for Large Multidimensional Scientific Datasets", In Proceedings of the 17th International Conference on Scientific and Statistical Database Management, Jun. 2005, 10 Pages.
Qunai, Yu, "Hierarchical Stack-Based Twig Query Algorithm of XML Data", In Proceedings of the 2010 International Forum on Information Technology and Applications, vol. 1, Jul. 16, 2010, 6 Pages.
Arnold, et al., "Stack Trace Analysis for Large Scale Debugging", In Proceedings of the Parallel and Distributed Processing Symposium, Mar. 2007, 10 Pages.
Carmo, et al., "Visualization of Large Volumes of Information Using Different Representations", In Proceedings of the 1997 IEEE Conference on Information Visualization, Aug. 1997, 5 Pages.
Foulks, et al., "MultiResolution Data Access Within the Visit Visualization Environment", In Proceedings of the Nasa Science and Technology Conference, vol. 7, Jun. 2007, 3 Pages.
Freitag, et al., "Adaptive MultiResolution Visualization of Large Data Sets using Parallel Octrees", In Proceedings of SC99, Nov. 1999, 11 Pages.
Friedman, Mark, "Dynamic Performance Analysis: Rules and Guidance for Visual Studio Profiling Tools Users", Retrieved From <<https://msdn.microsoft.com/en-us/library/ff678495(v=vs. 100). aspx>>, May 2010, 10 Pages.
Gao, et al., "A Parallel Multiresolution Volume Rendering Algorithm for Large Data Visualization", In Parallel Computing vol. 31, Issue 2, Dec. 9, 2004, 21 Pages.
Hirzel, et al., "Bursty Tracing: A Framework for Low-Overhead Temporal Profiling", In Proceedings of the 4th ACM Workshop on Feedback-Directed and Dynamic Optimization, Dec. 2001, 10 Pages.
Itzkowitz, et al., "The Sun Studio Performance Tools", Retrieved From <<http://web.archive.org/web/20071012211327/http://developers. sun.com/solaris/articles/perftools.html>>, Nov. 10, 2005, 15 Pages.
Lee, et al., "Correcting the Dynamic Call Graph Using Control-Flow Constraints", In Proceedings of the International Conference on Compiler Construction, Mar. 2007, 22 Pages.
Mysore, et al., "Formulating and Implementing Profiling over Adaptive Ranges", In ACM Transactions on Architecture and Code Optimization, vol. 5, Issue 1, May 2008, 32 Pages.
Mysore, et al., "Profiling over Adaptive Ranges", In Proceedings of the International Symposium on Code Generation and Optimization, Mar. 2006, 12 Pages.
"International Search Report & Written Opinion Issued in PCT Application No. PCT/US2011/044911", dated Feb. 21, 2012, 8 Pages.

* cited by examiner

ADAPTIVE TREE STRUCTURE FOR VISUALIZING DATA

RELATED APPLICATION

This application is a continuation of U.S. application Ser. No. 12/956,127, filed on Nov. 30, 2010, which was issued as U.S. Pat. No. 8,595,750 on Nov. 26, 2013, entitled "ADAPTIVE TREE STRUCTURE FOR VISUALIZING DATA", at least some of which may be incorporated herein.

BACKGROUND

Today, many applications store, process, and/or visualize large amounts of data. For example, an application development environment may allow users to develop, test, and deploy graphical user interfaces, websites, web services, and/or other applications. It may be advantageous for developers to track and/or visualize events regarding the execution of such applications, which may provide insight into events, such as context switches, application calls into an application program interface, CPU utilization, sampling, and/or a wide variety of other events. In this way, the developer may visually analyze performance data of the application's execution, for example, through a timeline of events. Unfortunately, execution of an application over a few minutes may result in millions of events. Current event visualization techniques attempt to manage such large amounts of event data by pre-calculating visualization data for various visual resolutions.

SUMMARY

This Summary is provided to introduce a selection of concepts in a simplified form that are further described below in the Detailed Description. This Summary is not intended to identify key factors or essential features of the claimed subject matter, nor is it intended to be used to limit the scope of the claimed subject matter.

Among other things, one or more systems and/or techniques for generating an adaptive tree structure based upon data density of an event dataset and one or more systems and/or techniques for determining node data of events within the adaptive tree structure are disclosed herein. While one or more examples illustrated herein may describe the implementation of the adaptive tree structure in the context of events associated with an application's execution, it may be appreciated that the adaptive tree structure is not limited to storing data regarding such events, but may be used to store any type of data (e.g., data recorded over time, data associated with text documents, data associated with spreadsheets, data associated with network traffic, data associated with a social network, and/or any other type of data). In one example, events regarding the execution of an application may be recorded as a plurality of raw events within an event dataset. For example, context switching (e.g., the switching of CPU usage between applications), application calls into an application program interface (e.g., a call resulting in the application being blocked because a file is locked), CPU usage, sampling (e.g., collecting a sample event to determine whether an application is executing at a particular time), and/or a plethora of other events may be recorded as raw events within the event dataset. The adaptive tree structure may be generated to store pre-calculated event data associated with particular visual resolutions of the event dataset or portions thereof. Event data at a particular visual resolution may be extracted from the adaptive tree structure for visualization, such as through an event timeline.

It may be appreciated that the adaptive tree structure may comprise one or more levels of nodes. It may be appreciated that a number of events assigned to a node may be limited by a threshold number, such that a node may be assigned no more than the threshold number of events (e.g., a threshold number of 1,000 events). It may be appreciated that a node may be associated with a time span corresponding to a time span of events within the event dataset. In this way, a node may cover raw events in the event dataset covered by the time span of the node (e.g., a node may be associated with a time span of 0-30 seconds covering 500 raw events within the event dataset). However, if a node covers a number of raw events within the event dataset greater than the threshold number (e.g., the node may cover 195,500 raw events occurring between 30-60 seconds within the event dataset, which is greater than the threshold number of 1,000), then the raw events within the event dataset covered by node may be aggregated into summary events. In this way, the node may be assigned a number of summary events no greater than the threshold number (e.g., 195,500 raw events may be aggregated into 1,000 summary events).

It may be appreciated that a node may be a summary node or a raw node. A raw node may be a node that covers a number of raw events within the event dataset less than or equal to the predetermine number (e.g., a node may be associated with a time span of 0-30 seconds covering 500 raw events within the event dataset, which is less than or equal to the threshold number of 1,000). In this way, the node may be assigned the 500 raw events, and may be designated as a raw node. It may be appreciated that a raw node may be a leaf node, without child nodes, within the adaptive tree structure. A summary node may be a node that covers a number of raw events within the event dataset greater than the predetermined number (e.g., a node may comprise a time span of 30-60 seconds corresponding to 195,500 raw events within the event dataset, which is greater than the threshold number of 1,000). In this way, the node may be assigned a number of summary events aggregated from the raw events covered by the time span of the node, where the number of summary events equals the predetermined number (e.g., the summary node may be assigned 1,000 summary events aggregated from the 195,500 raw events). It may be appreciated that a summary node may be a non-leaf node associated with a predetermined number of child nodes (e.g., a summary node may be associated with a predetermined number of 4 child nodes, such that respective child nodes correspond to ¼ of the time span of the summary node).

During the generation of the adaptive tree structure, one or more levels of nodes may be specified. For example, a first level may be specified with a root node. A time span of the root node may correspond to a total time span of the event dataset (e.g., the root node may be associated with a time span 0-120 seconds covering 200,000 raw events recorded over 120 seconds). Because the root node may cover a greater number of raw events than the threshold number, the root node may be assigned a number of summary events aggregated from the raw events covered by the root node, where the number of summary events is less than or equal to the threshold number (e.g., the 200,000 raw events may be aggregated into 1,000 raw events that are assigned to the root node). The root node may be designated as a summary node. It may be appreciated that the root node may be associated with a predetermined number of child nodes because the root node is a summary node (e.g., root node of level 1 may be associated with 4 child nodes of level 2).

One or more additional levels may be specified within the adaptive tree structure. For a current level of the adaptive tree: a determination of whether a previous level immediately before the current level comprises one or more summary nodes may be made (e.g., if the previous level comprises merely raw nodes (leaf nodes), then the adaptive tree structure may be complete). If the previous level comprises one or more summary nodes, then for respective summary nodes: a predetermined number of child nodes may be generate for a summary node, where respective time spans of the child nodes correspond to fractions of a time span of the summary node (e.g., if a time span of the summary node covers 30-60 seconds of raw events and 4 child nodes are generated, then respective time spans of the child nodes may be ¼ of the 30 second time span of the summary node, such that a first child node may comprise a time span of 30-37.5, a second child node may comprise a time span of 37.5-45, a third child node may be comprise a time span of 45-52.5, and a fourth child node may comprise a time span of 52.5-60). For respective child nodes: if a number of raw events within the event dataset covered by a time span of a child node is less than or equal to the threshold number, then the child node may be designated as a raw node and may be assigned the raw events, otherwise the child node may be designated as a summary node and may be assigned a number of summary events derived from the raw events within the event dataset covered by the time span of the child node. The number of summary events may be equal to the threshold number. In this way, the adaptive tree structure may be generated based upon data density of the event dataset (e.g., more nodes and/or levels may be specified in dense areas of raw events, whereas fewer nodes and/or levels may be specified in sparse areas of raw events).

The adaptive tree structure may comprise one or more levels of nodes, such as raw nodes (leaf nodes) comprising raw events and/or summary nodes (non-leaf nodes) comprising summary events aggregated from raw events. Respective levels within the adaptive tree structure may correspond to visual resolutions of the event dataset or portions thereof. For example, a first level may comprise a root node (a summary node) assigned summary events aggregated from an entire time span of the event dataset. Higher levels, such as the first level, may provide low resolution views of the event dataset or a portion thereof, which may be used to provide a zoomed out visualization of the event dataset (e.g., the first level may provide 1,000 summary events corresponding to 200,000 raw events over 120 seconds). Lower levels, such as a fourth level out of a six level adaptive tree structure, may provide high resolution views of a particular portion of the event dataset, which may be used to provide a zoomed in visualization of the event dataset of a portion thereof (e.g., a summary node within a fourth level may provide 1,000 summary events corresponding to 10,000 raw events over a 1.875 second time span). It may be appreciated that a timeline may be populated with event data derived from node data within the adaptive tree structure. For example, node data may be determined from one or two nodes within the adaptive tree structure based upon a requested time span (e.g., a user may request a visualization of events occurring within a time span of 30-60 seconds). One or two nodes corresponding to the requested time span of 30-60 seconds may be determined as comprising the node data. In this way, the timeline may be populated with event data derived from the node data. A user may be able to visualize events, zoom-in, zoom-out, scroll, and/or perform other interactions with the timeline. Such user input may be satisfied by updating the timeline with corresponding event data derived from node data within the adaptive tree structure.

To the accomplishment of the foregoing and related ends, the following description and annexed drawings set forth certain illustrative aspects and implementations. These are indicative of but a few of the various ways in which one or more aspects may be employed. Other aspects, advantages, and novel features of the disclosure will become apparent from the following detailed description when considered in conjunction with the annexed drawings.

DETAILED DESCRIPTION

Figure 1:
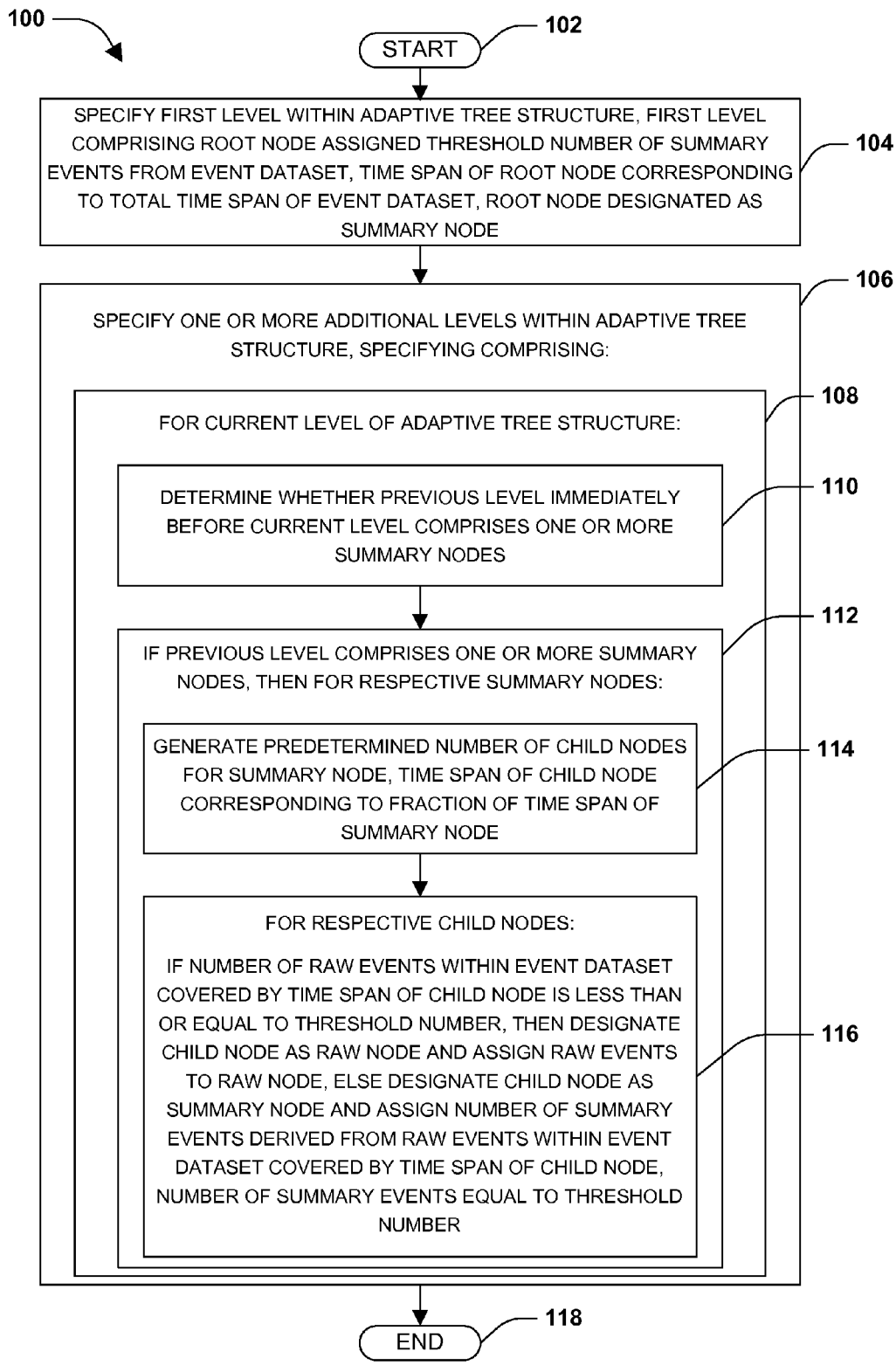
FIG. 1 is a flow chart illustrating an exemplary method of generating an adaptive tree structure based upon data density of an event dataset comprising a plurality of raw events.

The claimed subject matter is now described with reference to the drawings, wherein like reference numerals are used to refer to like elements throughout. In the following description, for purposes of explanation, numerous specific details are set forth in order to provide a thorough understanding of the claimed subject matter. It may be evident, however, that the claimed subject matter may be practiced without these specific details. In other instances, structures and devices are illustrated in block diagram form in order to facilitate describing the claimed subject matter.

Today, execution of an application may comprise a complex set of events. For example, a web application may execute hundreds of thousands of lines of code when interacting with databases, web services, and/or various client computing devices during execution. It may be advantageous to track, store, analyze, and/or visualize such events, which may provide insight into the performance of the application. For example, recorded event data may be presented within an interactive timeline of a user interface. The user may scroll to various time ranges of events, change zoom scale, and/or perform other interactions with the interactive timeline to view events. In one example, events may be plotted along a time axis of a timeline. The timeline may provide the user with the ability to view the entire time span of recorded events (e.g., a zoomed out view of events at a course granularity), zoom-in to a particular time span (e.g., a zoomed in view of events at a finer granularity), and/or scroll to various time spans within the timeline.

Unfortunately, the timeline may be associated with a large event dataset (e.g., millions of events recorded over a few minutes of an application's execution), which may affect responsiveness of the timeline, storage overhead, and/or other resource utilization. Current visualization techniques may attempt to manage large event datasets by pre-calculating timeline information for various zoom levels, which may allow for a smooth response to user actions, such as scrolling and zooming. Such pre-calculated timeline information may be stored within a data structure, such as a tree structure comprising one or more levels of nodes (e.g., a first level may comprise a root node representing events over the entire time span of the event dataset, a second level may comprise 4 nodes representing events over respective ¼ portions of the entire time span, a third level may comprise 16 nodes representing events over respective ¹⁄₁₆ portions of the entire time span, etc.). However, as the tree structure becomes deeper, the number of nodes exponentially grows. The depth of the tree structure may depend on the total time of the event dataset and/or a maximum zoom factor at which events may be presented within the timeline. The exponential growth may render the tree structure unscalable, which may limit the ability to visualize longer time ranges and/or the ability to zoom. Additionally, the tree structure may not take into account data density distribution over time, and may use an equal amount of storage for dense and spare areas, which may waste storage.

Accordingly, one or more systems and/or techniques for generating an adaptive tree structure based upon data density of an event dataset and one or more systems and/or techniques for determining node data of events from within the adaptive tree structure are provided herein. The adaptive tree structure may comprise levels and/or nodes specified based upon data density (e.g., nodes covering dense event data may be split into child nodes, whereas nodes covering spare data may be designated as leaf nodes), as opposed to a uniform complete tree where respective levels and/or nodes are uniform (e.g., respective level of nodes may be uniformly split until a final level is created: level 1 has 1 node, level 2 has 4 nodes, level 3 has 16 nodes, level 4 has 64 nodes, etc.). For example, the adaptive tree structure may comprise more levels and/or nodes for areas of concentrated raw data, and may comprise fewer levels and/or nodes for areas of spare raw data. In this way, overhead storage of event data may be mitigated because storage space for nodes and/or levels may be allocated based upon data density (e.g., overhead merely where needed and not where not needed).

The adaptive tree structure may comprise one or more levels corresponding to pre-calculated resolutions of events within an event dataset. For example, higher levels, such as level 1 or level 2, may comprise a zoomed out resolution of event data at a coarse granularity, whereas lower levels, such as level 5 or level 6, may comprise a zoomed in resolution of event data at a finer granularity. Thus, particular levels and/or nodes may be used to determine node data of events at a desired resolution. The node data may be used to populate visualization of events, such as a timeline of events. In this way, the user may interact with the timeline (e.g., zoom, scroll, etc.), such that visualization of events at a corresponding resolution may be populated within the timeline based upon extracting node data from particular levels and/or nodes within the adaptive tree structure. In addition to mitigating storage overhead by generating the adaptive tree structure based upon data density, timeline responsiveness may be enhanced because a request for event data may be satisfied, for example, with no more than two nodes. Additionally, the nodes may comprise a number of events limited by a threshold number, such that the maximum number of events processed as node data may be constrained. In this way, the adaptive tree structure may comprise pre-calculated resolutions of event data that may be used to provide an interactive timeline of event data to users.

One embodiment of generating an adaptive tree structure based upon data density of an event dataset comprising a plurality of raw events is illustrated by an exemplary method 100 in FIG. 1. At 102, the method starts. It may be appreciated that the plurality of raw events within the event dataset may correspond to a wide variety of data (e.g., data recorded over time, events associated with the execution of an application, events occurring within a social network, textual data, spreadsheet data, logistical data, etc.). At 104, a first level may be specified within the adaptive tree structure. The first level may comprise a root node. A time span of the root node may correspond to a total time span of the event dataset (e.g., 120 seconds of 200,000 raw events), and thus the root node may cover raw events occurring within the total time span of the event dataset (e.g., the root node may cover the 200,000 raw events).

It may be appreciated that a number of events assigned to a node may be limited by a threshold number, such that the node may be assigned no more than the threshold number of events. For example, limiting the number of events assigned to nodes may limit the number of events processed when populating a timeline, which may enhance responsiveness of the timeline, such as user interface draw times (e.g., events assigned to one or two nodes may be used to satisfy a request for event data to populate a timeline). The threshold number may represent a maximum number of events, such as summary events and/or raw events, that may be assigned to a node.

It may be appreciated that if a node covers a number of raw events within the event dataset less than or equal to the threshold number (e.g., a node's time span of 0-30 seconds covers 500 raw events within the event dataset, which is less than a threshold number of 1,000), then the node may be designated as a raw node (a leaf node without child nodes) and the raw events covered by the raw node may be assigned to the raw node. However, if the node covers a number of raw events within the event dataset greater than the threshold number (e.g., a node's time span of 30-60 seconds covers 195,500 raw events within the event dataset, which is greater than the threshold number of 1,000), then the node may be designated as a summary node (a non-leaf node with a predetermined number of child nodes) and a number of summary events derived from the raw events may be assigned to the summary node, where the number of summary events may be equal to the threshold number. In one example of deriving summary events, raw events may be aggregated into summary events. In particular, raw events with an appropriate time span for the resolution associated with the summary node may be selected as summary events (e.g., a raw event with an appropriate time span may be a raw event having a large enough time span such that the raw event may be easily visible when displayed, for example as a rectangle, within a timeline at a current zoom level). Similarly, raw events that do not comprise an appropriate time span for the resolution associated with the summary node may be aggregated (e.g., combined) into larger summary events that may be visible, for example, when displayed as rectangles along the timeline at the current zoom level.

The root node may be assigned a number of summary events derived from the raw events of the event dataset because the root node may cover more raw events within the event dataset than the threshold number (e.g., the root node's time span of 120 seconds may cover 200,000 raw events, which is greater than the threshold number of 1,000). The number of summary events may be equal to the threshold number. In this way, the root node may be designates as a summary node.

At 106, one or more additional levels within the adaptive tree structure may be specified. In particular, at 108, for a current level of the adaptive tree structure, a determination as to whether a previous level immediately before the current level comprises one or more summary nodes (non-leaf nodes) may be made, at 110. At 112, if the previous level comprises one or more summary nodes, then for respective summary nodes: a predetermined number of child nodes may be generated for a summary node, where a time span of a child node may correspond to a fraction of a time span of the summary node (e.g., 4 child nodes may be generated for a summary node, where a child node comprises a time span equal to ¼ a time span of the summary node), at 114. It may be appreciated that a time span of a node may correspond to a time span of raw events within the event dataset covered by the node. For example, the summary node may comprise a time span of 30-60 covering 195,500 events. A predetermined number, such as 4, of child nodes may be generated for the summary node, where a time span of a child node corresponds to ¼ of the 30 second time span of the summary node (e.g., a first child node may comprise a time span of 30-37.5 seconds, such that the first child node covers raw events over the time span of 30-37.5 seconds within the event dataset; a second child node may comprise a time span of 37.5-45 seconds, such that the second child node covers raw events over the time span of 37.5-45 seconds within the dataset; etc.). In one example, respective time spans of child nodes of the summary node may comprise equal lengths, where a sum of respective time spans of the child nodes equals the time span of the summary node. In another example, respective time spans of one or more child nodes may differ among different child nodes. Similarly, while generating 4 child nodes for a summary node, where a child node comprises a time span equal to ¼ a time span of the summary node is mentioned herein, the instant application is not intended to be so limited. That is, any suitable number of child nodes may be generated, where a child node may comprise any suitable time span. Moreover, the number of child nodes per respective summary nodes may differ between different summary nodes and/or the respective timespans thereof may differ as well.

It may be appreciated that respective child nodes generated for the summary node may be designated as a summary node or a raw node based upon whether raw events covered by the node are less than or equal to the threshold number (e.g., threshold number of 1,000 events). At 116, if the number of raw events within event dataset covered by a time span of a child node is less than or equal to the threshold number (e.g., the child node's time span of 30-37.5 seconds covers 447 raw events, which is less than the threshold number of 1,000 events), the child node may be designated as a raw node, and may be assigned the raw events. However, if the number of raw events within the event dataset covered by the time span of the child node is greater than the threshold number (e.g., the child nodes' time span of 37.5-45 seconds covers 143,006 raw events, which is greater than the threshold number of 1,000 events), the child node may be designated as a summary node, and may be assigned a number of summary events derived from the raw events less than or equal to the threshold number. In one example of deriving summary events, raw events covered by the time span may be aggregated as summary events for the summary node. Thus, raw events comprising a short time span (e.g., raw events that may be visually too small when displayed within a timeline) may be aggregated together, such that a summary event may be indicative of two or more raw events. Alternatively, or in addition, a number of raw events less than or equal to the threshold number may be selected as the events for the summary node (e.g., those raw events that are more revealing or indicative of content covered by all of the raw events may be chosen).

In this way, an adaptive tree structure comprising one or more levels of nodes may be generated based upon data density of events within the event dataset. For example, areas of sparse data may result in raw nodes without child nodes (e.g., a node having a time span covering 500 raw events may be designated as a raw node assigned the 500 raw events), whereas areas of dense data may result in summary nodes with child nodes (e.g., a node having a time span covering 195,500 raw events may result in a summary node assigned 1,000 summary events, such that child nodes may be created for the summary node).

It may be appreciated that node data of events may be determined from within the adaptive tree structure. For example, node data of events may be determined within the adaptive tree structure to satisfy a request to populate a timeline with event data. In particular, a requested time span may be received (e.g., a time span corresponding to a view action, a zoom action, scroll action, and/or other actions within the timeline). A level (L) corresponding to $$\frac{T}{CPNL^L} < \text{requested time span} \le \frac{T}{CPNL^{L-1}}$$

may be determined, where T is the total time span of the event dataset and CPNL is the predetermined number of child nodes per summary node. For example, the adaptive tree structure may comprise events over a total time span T=120 second, and 4 child nodes (CPML=4) may have been created for respective summary nodes (non-leaf nodes) within the adaptive tree structure. Thus, a requested time span of 30-35 seconds may be used to determine a level (L)=3 (e.g., $\{120/4^L\}<5<=\{120/4^{L-1}\}$ is satisfied where level (L)=3 because 1.875<5<=7.5).

Node data within the adaptive tree structure corresponding to the request time span may be determined based upon initially evaluating nodes at level (L), which may involve one or more of the following four determinations. First, if the requested time span falls completely within a node of level (L), then the node is determined as comprising the node data (e.g., a requested time span 30-35 may fall completely within a node of level 3 having a time span of 30-37.5). Second, if the requested time span falls completely within two adjacent nodes of level (L), then the two adjacent nodes may be determined as comprising the node data (e.g., a requested time span 35-40 may fall completely within two adjacent times having time spans of 30-37.5 and 37.5-45 within level 3). Third, if a first segment of the requested time span falls completely within a first node of level (L) and a second segment of the requested time span does not fall within respective nodes of level (L) (e.g., a requested time span 58-63 may comprise a first segment 58-60 that may fall completely within a first node of level 3 having a time span of 52.5-60, but a second segment 60-63 may not fall within respective nodes of level (L)), then the first node may be determined as comprising a first portion of the node data and a second node within a different level (e.g., a previous level before level (L)) may be determined as comprising a second portion of the node data, where the second segment of the requested time span falls completely within the second node. It may be appreciated that the first node may be any node within level (L), and that the second node may be any node within another level. Fourth, if none of level (L)'s nodes span at least a portion of the requested time span, the level (L) may be decremented by one level to a previous level and the determining node data may be iterated using the decremented level. In one example, node data may be derived from no more than two nodes.

It will be appreciated that while language such as first node, second node, first portion, second portion, first segment, and/or second segment or like language may be used herein, that such language is not meant to be limiting. For example, a first node may be any node within level (L). Similarly, language such as first and second is merely used as identifiers herein and not necessary to indicate an ordering of things (e.g., one item coming (temporally) before another).

It may be appreciated that the node data may be used to derive event data for a timeline, which may be presented to a user. If the node data corresponds to summary events of a summary node, then the summary events may be stored with the node data (e.g., the summary events may have been previously aggregated from raw events into an appropriate visual resolution when stored within the summary node). If the node data corresponds to raw events of a raw node, then the raw events may be aggregated into summary events, which may be stored within the node data (e.g., raw events that may be visually small at a current resolution of the timeline may be aggregated into larger summary events for visual clarity of events within the timeline).

The timeline may be interactive, such that a user may view, zoom, scroll, and/or perform other user input within the timeline. In one example, user input corresponding to a zoom action within the timeline may be received. The user input may comprise a second requested time span. The second requested time span may be different than the requested time span corresponding to the current timeline view. Second node data corresponding to the second requested time span may be determined within the adaptive tree structure (e.g., one or two nodes may be determined as comprising the second node data). In this way, the timeline may be updated with events corresponding to the second node data to present a new timeline view.

In another example, user input corresponding to a scroll action within the timeline may be received. The user input may comprise a second requested time span. The second requested time span may be different than the requested time span corresponding to the current timeline view. Second node data corresponding to the second requested time span may be determined within the adaptive tree structure (e.g., one or two nodes may be determined as comprising the second node data). In this way, the timeline may be updated with events corresponding to the second node data to present a new timeline view. At 118, the method ends.

Figure 2:
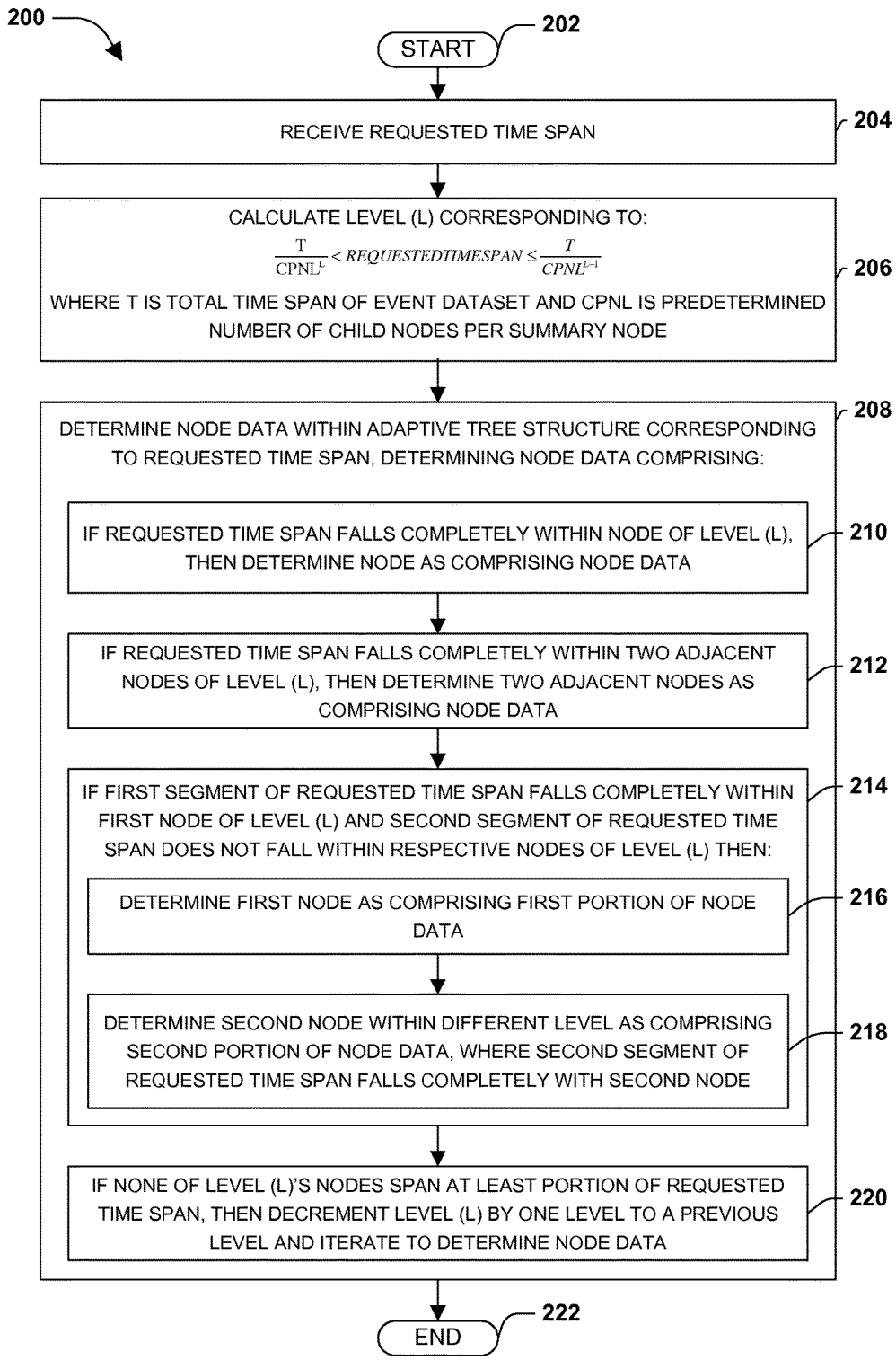
FIG. 2 is a flow chart illustrating an exemplary method of determining node data of events from within an adaptive tree structure.

One embodiment of determining node data of events from within an adaptive tree structure is illustrated by an exemplary method 200 in FIG. 2. At 202, the method starts. At 204, a requested time span may be received. For example, a user may request a particular view of events within a timeline corresponding to the requested time span (e.g., a request to view events occurring between 0-20 seconds). At 206, a level (L) corresponding to $$\frac{T}{CPNL^L} < \text{requested time span} \leq \frac{T}{CPNL^{L-1}}$$

may be calculated, where T is the total time span of an event dataset (e.g., 120 seconds of 200,000 events) and CPNL is a predetermined number of child nodes per summary node (e.g., 4 child nodes may have been created for respective summary nodes (non-leaf nodes) within the adaptive tree). That is, the adaptive tree structure may comprise events over a total time span T=120 second, where 4 child nodes (CPNL=4) may have been created for respective summary nodes within the adaptive tree structure. In one example, a request time span of 0-20 seconds may be used to determine a level (L)=2 (e.g., $\{120/4^L\}<20<=\{120/4^{L-1}\}$ is satisfied where level (L)=2 because 7.5<20<=30).

At 208, node data corresponding to the requested time span may be determined within the adaptive tree structure. It may be appreciated that node data may comprise events derived from one or two nodes within the adaptive tree structure, which may be used to populate a timeline with such events. In one example, the determining node data may comprise one or more of the following determinations. First, at 210, if the requested time span falls completely within a node of level (L), then the node is determined as comprising the node data (e.g., the requested time span of 0-20 seconds may fall within a node of level 2 having a time span of 0-30 seconds). Second, at 212, if the requested time span falls completely within two adjacent nodes of level (L), then the two adjacent nodes may be determined as comprising the node data (e.g., a requested time span of 10-40 seconds may fall within a first node of level 2 having a time span of 0-30 seconds and a second node of level 2 having a time span of 30-60 seconds, where the requested time span falls completely within the combination of the time spans).

Third, at 214, if a first segment of the requested time span falls completely within a first node of level (L) and a second segment of the requested time span does not fall within respective nodes of level (L), then: the first node may be determined as comprising a first portion of the node data, at 216, and a second node within a different level (e.g., a previous level before level (L)) may be determined as comprising a second portion of the node data, where the second segment of the requested time span falls completely within the second node, at 218. In this way, node data may be derived from the first node of level (L) and the second node of a different level.

Fourth, at 220, if none of level (L)'s nodes span at least a portion of the requested time span, then level (L) may be decremented by one level to a previous level, and the determining node data may be iterated using the decremented level. In this way, node data of events corresponding to the requested time span may be satisfied by one or two nodes within the adaptive tree structure.

It may be advantageous to determine node data of events at an appropriate viewing resolution for a current view of the timeline (e.g., finer granularity of events for a zoomed in view, coarser granularity of events for a zoomed out view, etc.). That is, the timeline may display events as rectangles along a time axis, for example. However, some events may be too short in duration to be easily viewed along the timeline. Thus, certain events may be aggregated (combined) to create easily visible events when viewed at the resolution for the current view of the timeline. In particular, if node data corresponds to summary events of a summary node, then the summary events may be stored within the node data of events (e.g., summary events may have been previously aggregated from raw events when assigned to the summary node). If the node data corresponds to raw events of a raw node, then the raw events may (or may not) be aggregated into summary events, which may be store within the node data (e.g., raw events that may be visually small at a current zoom level within the timeline may be aggregated into visually larger summary events for visual clarity of events within the timeline).

The timeline populated with event data derived from the node data may be presented. The timeline may be an interactive timeline that may allow users to view, scroll, zoom, and/or perform other actions with the timeline. The timeline may be populated with events derived from one or two nodes within the adaptive tree structure. For example, user input corresponding to a zoom action and/or a scroll action within a timeline may be received. The user input may comprise a second requested time span different than the requested time span corresponding to the current timeline view. Second node data corresponding to the second requested time span may be determined within the adaptive tree structure. In this way, the timeline may be populated with events in a responsive manner because merely one or two nodes may be determined as comprising the node data, which may mitigate processing time. At 222, the method ends.

Figure 3:
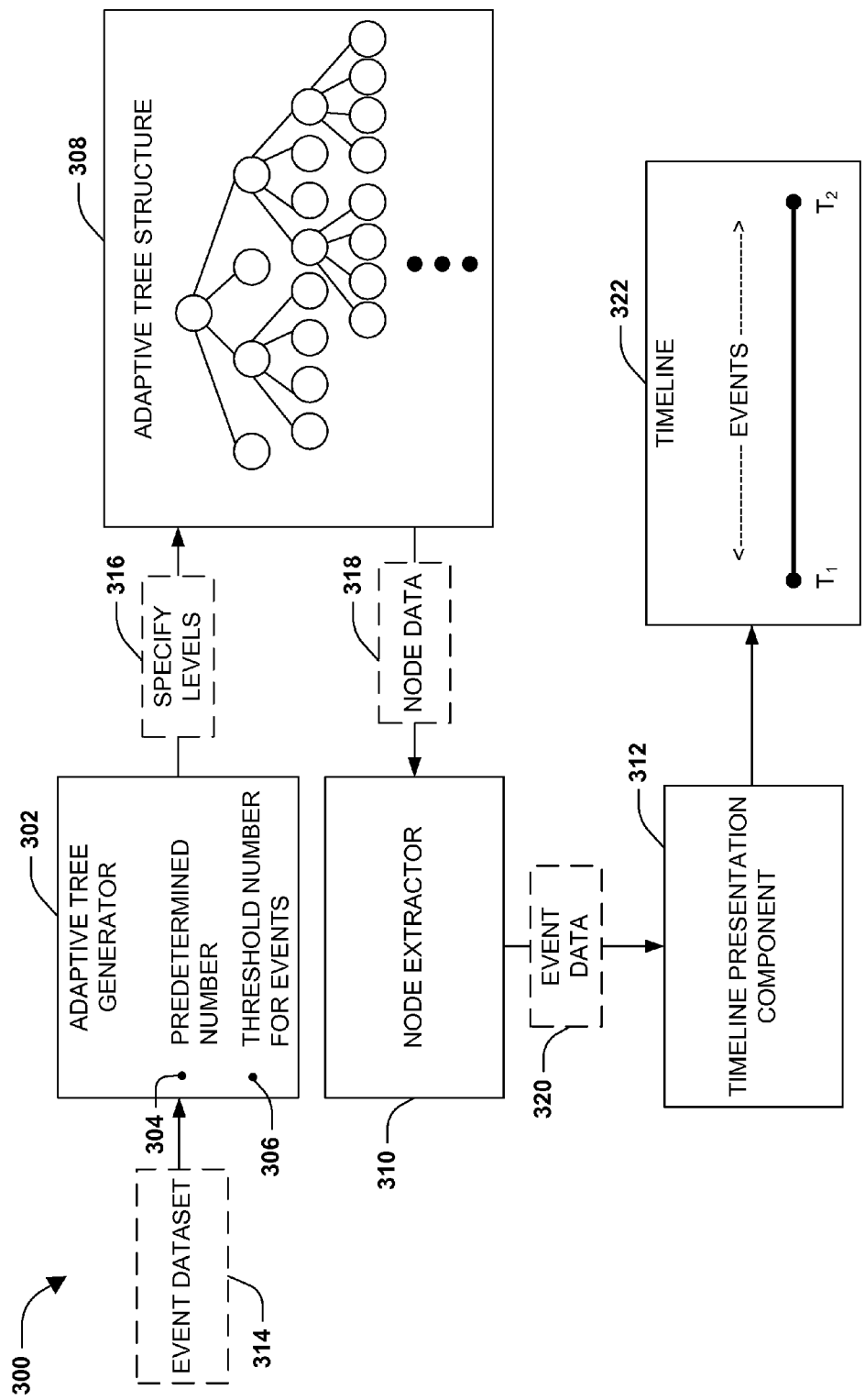
FIG. 3 is a component block diagram illustrating an exemplary system for generating an adaptive tree structure based upon density of an event dataset, which may be used to populate a timeline with event data.

FIG. 3 illustrates an example of a system 300 configured for generating an adaptive tree structure 308 based upon density of an event dataset 314, which may be used to populate a timeline 322 with event data 320. In one example, the event dataset 314 may comprise raw events recorded during the execution of an application (e.g., 200,000 raw events recorded over 120 seconds). The adaptive tree structure 308 may be generated with one or more levels of nodes, where a level may represent a resolution of events. For example, higher levels, such as level 1, may comprise zoomed out resolutions of event data at a coarse granularity, which may be used to display a zoomed out view of events within the timeline 322. Lower levels, such as level 5, may comprise zoomed in resolutions of event data at a finer granularity, which may be used to display a zoomed in view of events within the timeline 322.

The system 300 may comprise an adaptive tree generator component 302, a node extractor component 310, and/or a timeline presentation component 312. It may be appreciated that the adaptive tree generator 302 may be associated with a threshold number 306. In one example, the threshold number 306 may specify a maximum number of events that may be assigned to a node (e.g., the threshold number 306 may specify that a node may comprise no more than 1,000 events). The threshold number 306 may be used by the adaptive tree generator 302 to determine whether a node is to be designated as a summary node or a raw node. For example, a node may be associated with a time span corresponding to a time span of raw events within the event dataset 314. If the time span of the node covers more raw events than the threshold number 306 (e.g., a time span of 30-60 seconds of a node may cover 195,500 raw events within the event dataset 314), then the node may be designated as a summary node, and summary events derived from the raw events may be assigned to the summary node, where the number of summary events may equal the threshold number 306 (e.g., 195,500 raw events may be aggregated into 1,000 summary events). However, if the number of raw events within the event dataset 314 covered by the time span of the node is less than or equal to the threshold number 306, then the node may be designated as a raw node, and the raw events may be assigned to the raw node.

The adaptive tree generator 302 may be associated with a predetermined number 304. In one example, the predetermined number 304 may specify a number of child nodes to create for a summary node. The predetermined number 304 may be used by the adaptive tree generator 302 when specifying levels of the adaptive tree structure 308 (e.g., if a previous level comprises a summary node, then the adaptive tree generator 302 may generator a number of child nodes for the summary node equal to the predetermined number, such as 4 child nodes).

In one example of generating the adaptive tree structure 308, the adaptive tree generator 302 may be configured to specify (e.g., specify levels 316) a first level within the adaptive tree structure 308. The first level may comprise a root node assigned a number of summary events equal to the threshold number 306. In particular, a time span of the root node may correspond to a total time span of the event dataset 314 (e.g., 120 seconds), which may cover more raw events within the event dataset 314 (e.g., 200,000 raw events) than the threshold number 306. Thus, the root node may be designated as a summary node.

The adaptive tree generator 302 may be configured to specify (e.g., specify levels 316) one or more additional levels within the adaptive tree structure 308. In particular, for a current level of the adaptive tree structure 308, a determination may be made as to whether a previous level immediately before the current level comprises one or more summary nodes. If the previous level comprises one or more summary nodes, then for respective summary nodes: a number of child nodes equal to the predetermined number 304 may be generated for a summary node. A time span of a child node may correspond to a fraction of a time span of the summary node (e.g., a summary node may span 0-30 seconds, such that 4 child nodes may be generate with time spans 0-7.5, 7.5-15, 15-22.5, and 22.5-30 seconds respectively). The respective child nodes may be designated as raw nodes assigned raw events or summary nodes assigned summary events. In particular, for respective child nodes: if a number of raw events within the event dataset 314 covered by a time span of a child node is less than or equal to the threshold number 306, then the child node may be designated as a raw node and may be assigned the raw events, else the child node may be designated as a summary node and may be assigned a number of summary events derived from raw events within the event dataset covered by the time span of the child node, where the number of summary events equals the threshold number 306. In this way, the adaptive tree generator 302 may generate the adaptive tree structure 308 comprising one or more levels of nodes, where a level corresponds to a resolution of events, which may be displayed within the timeline 322.

The node extractor 310 may be configured to determine node data 318 of events within the adaptive tree structure 308. The node data 318 may be used by the timeline presentation component 312 to populate the timeline 322 with event data 320. In particular, the node extractor 310 may receive a requested time span. For example, the requested time span may correspond to the timeline 322 (e.g., a user may specify a desired time span of events to view within the timeline 322). The node extractor 310 may calculate a level (L) corresponding to $$\frac{T}{CPNL^L} < \text{requested time span} \leq \frac{T}{CPNL^{L-1}},$$

where T is the total time span of the event dataset 314 and CPNL is the predetermined number 304 of child nodes per summary node.

The node extractor 310 may determine node data 318 corresponding to the requested time span within the adaptive tree structure 318. In one example, the node extractor 310 may be configured to determine the node data 318 by performing one or more of the following four determinations. First, if the requested time span falls completely within a node of level (L), then the node extractor 310 may determine the node as comprising the node data 318. Second, if the requested time span falls completely within two adjacent nodes of level (L), then the node extractor 310 may determine the two adjacent nodes as comprising the node data. Third, if a first segment of the requested time span falls completely within a first node of level (L) and a second segment of the requested time span does not fall within respective nodes of level (L), then the first node may be determined as comprising a first portion of the node data 318 and a second node within a different level (e.g., a previous level before level (L)) may be determined as comprising a second portion of the node data, where the second segment of the requested time span falls completely within the second node. It may be appreciated that the first node may be any node within level (L), and that the second node may be any node within another level. Fourth, if none of level (L)'s nodes span at least a portion of the requested time span, then level (L) may be decremented by one level to a previous level, and the node extractor 310 may determine the node data 318 using the decremented level. In this way, the node extractor 310 may determine node data 318 derived from one or two nodes within the adaptive tree structure 308 based upon the requested time span.

The node data 318 may be used as event data 320 by the timeline presentation component 312 to populate the timeline 322 with events corresponding to the requested time span. The node extractor 310 may be configured to format the node data 318 to an appropriate viewing resolution for a current view of the timeline 322 (e.g., finer granularity of events for a zoomed in view, coarser granularity of events for a zoomed out view, etc.). In particular, if node data 318 corresponds to summary events of a summary node, then the summary events may be utilized as the node data 318 and/or the event data 320 (e.g., summary events may have been previously aggregated from raw events when assigned to summary nodes within the adaptive tree structure). If the node data corresponds to raw events of a raw node, then the raw events may (or may not) be aggregated into summary events, which may be utilized as the node data 318 and/or the event data 320 (e.g., raw events that may be visually small at a current zoom level within the timeline 322 may be aggregated into visually larger summary events for visual clarity of events within the timeline 322).

The timeline presentation component 312 may be configured to present the timeline 322 of event data 320 represented by the node data 318. The timeline presentation component 312 may be configured to update the timeline 322 with second event data represented by second node data determined by the node extractor 310 in response to user input corresponding to a scroll action, a zoom action, and/or other user input within the timeline 322. In this way, a user may interactively view events within the timeline 322. It may be appreciated that the timeline presentation component 312 may be configured to present event data 320 derived from node data 316 in a wide variety of formats, such as a textual presentation of events, a graphical representation of events, a web based presentation of events, a spreadsheet representation of events, etc.

Figure 4:
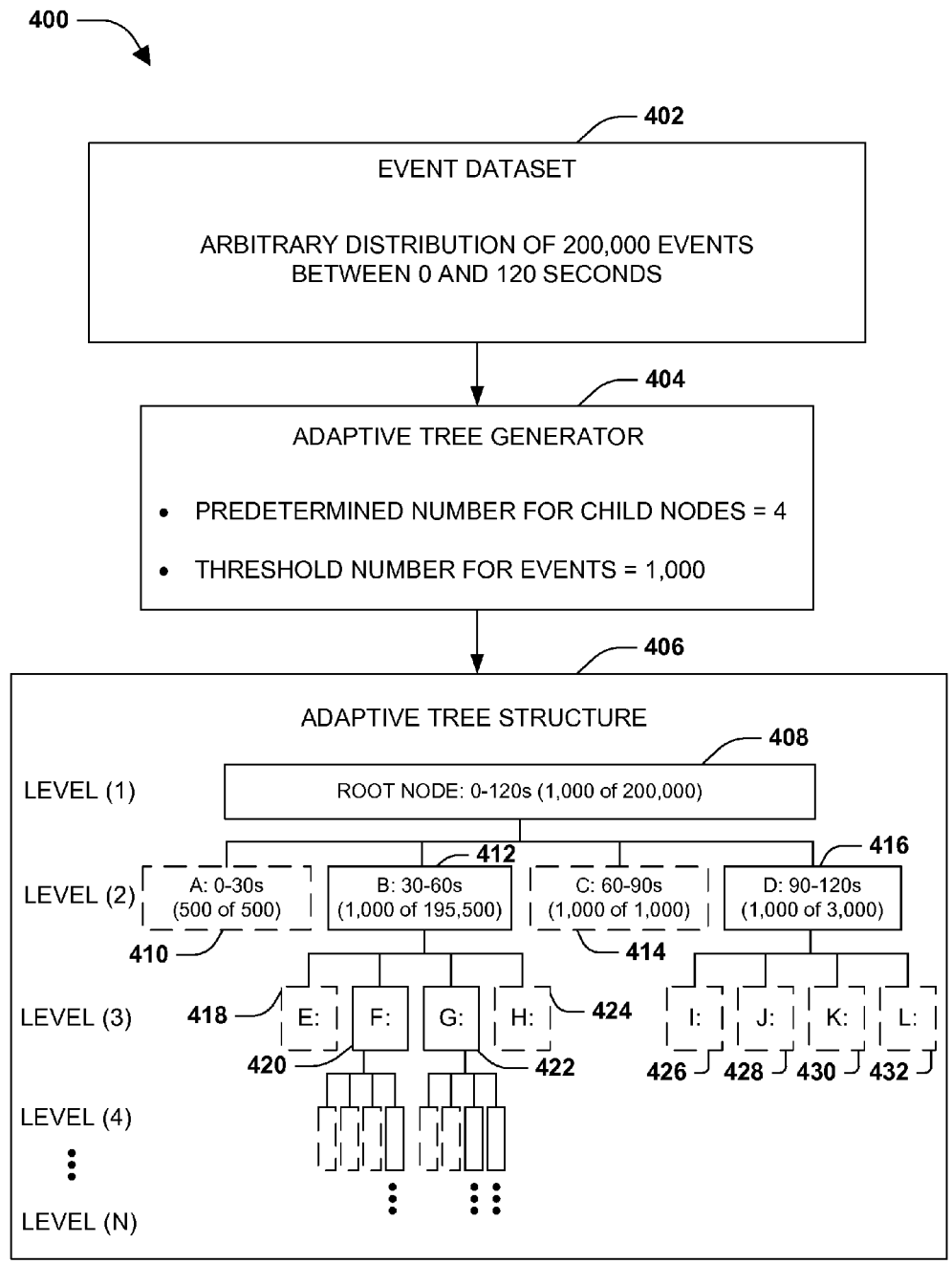
FIG. 4 is an illustration of an example of generating an adaptive tree structure.

FIG. 4 illustrates an example 400 of generating an adaptive tree structure 406. An event dataset 402 may comprise an arbitrary distribution of 200,000 raw events recorded between 0-120 seconds. An adaptive tree generator 404 may be configured to generate the adaptive tree structure 406. A predetermined number=4 may specify that 4 child nodes are to be generated for summary nodes (non-leaf nodes) within the adaptive tree structure 406. A threshold number=1,000 may specify that a node may comprise no more than 1,000 events.

The adaptive tree generator 404 may generate the adaptive tree structure 406 comprising one or more levels of nodes, where a level may correspond to a resolution of event data, which may be used to populate a timeline. In particular, the adaptive tree generator 404 may specify a level (1) comprising a root node 408. A time span of 0-120 seconds for the root node 408 may correspond to the total time span of 0-120 seconds for the event dataset 402. Thus, the root node 408 may cover the 200,000 raw events of the event dataset 402. However, the root node 408 may be limited to 1,000 events as specified by the threshold number=1,000. Thus, 1,000 summary events derived from the 200,000 raw events may be assigned to the root node 408, and the root node 408 may be designated as a summary node.

The adaptive tree generator 404 may specify one or more additional levels within the adaptive tree structure 406. For example, the adaptive tree generator 404 may specify a level (2). During the specifying of level (2), a determination may be made as to whether level (1), a previous level immediately before level (2), comprises one or more summary nodes. Because root node 408 is a summary node, 4 child nodes equal to the predetermined number of 4 may be generated for the root node 408. That is, node A 410, node B 412, node C 414, and node D 416 may be generated within level (2). The time spans of the child nodes may be equal fractions of the time span of root node 408. For example, a time span for node A 410 may be 0-30 seconds, a time span for node B 412 may be 30-60 seconds, a time span for node B 414 may be 60-90 seconds, and/or a time span for node C may be 90-120 seconds.

Because the distribution of raw events within the event dataset 402 may be arbitrary, the number of raw events covered by the time spans of the respective nodes of level (2) may be the same or different. For example, the time span 0-30 of node A 410 may cover 500 raw events within the event dataset 402. Because the 500 raw events covered by node A 410 is less than or equal to the threshold number=1,000, node A 410 may be designated as a raw node (a leaf node without child nodes within level (3)) and the 500 raw events may be assigned to node A 410. The time span 30-60 of node B 412 may cover 195,500 raw events within the event dataset 402. Because the 195,500 raw events covered by node B 412 is greater than the threshold number=1,000, node B 412 may be designated as a summary node (a non-leaf node that may have child nodes within level (3)) and 1,000 summary events derived from the 195,500 raw events may be assigned to node B 412. The time span 60-90 of node C 414 may cover 1,000 raw events within the event dataset 402. Because the 1,000 raw events covered by node C 414 is less than or equal to the threshold number=1,000, node C 414 may be designated as a raw node (a leaf node without child nodes within level (3)) and the 1,000 raw events may be assigned to node C 414. The time span 90-120 of node D 416 may cover 3,000 raw events within the event dataset 402. Because the 3,000 raw events covered by node D 416 is greater than the threshold number=1,000, node D 416 may be designated as a summary node (a non-leaf node that may have child nodes within level (3)) and 1,000 summary events derived from the 3,000 raw events may be assigned to node D 416.

It may be appreciated that the adaptive tree generator 404 may specify other levels within the adaptive tree structure 406, such as level (3), level (4), and/or other levels such as level (N). For example, adaptive tree generator 404 may specify within level (3) node E 418, node F 420, node G 422, and/or node H 424 as child nodes of node B 412, a summary node of level (2). The adaptive tree generator may specify within level (3) node 1426, node J 428, node K 430, and/or node L 432 as child nodes of node D 416, a summary node of level (3). In this way, the adaptive tree generator 404 may generate the adaptive tree structure 406 with one or more levels of nodes, where a level may correspond to a resolution of event data, which may be used to populate a timeline (e.g., level (1) may comprise coarse granularity of event data that may be used to provide event data for a zoomed out view of events; level (3) may comprise fine granularity of event data that may be used to provide event data for a zoomed in view of events; etc.).

Figure 5:
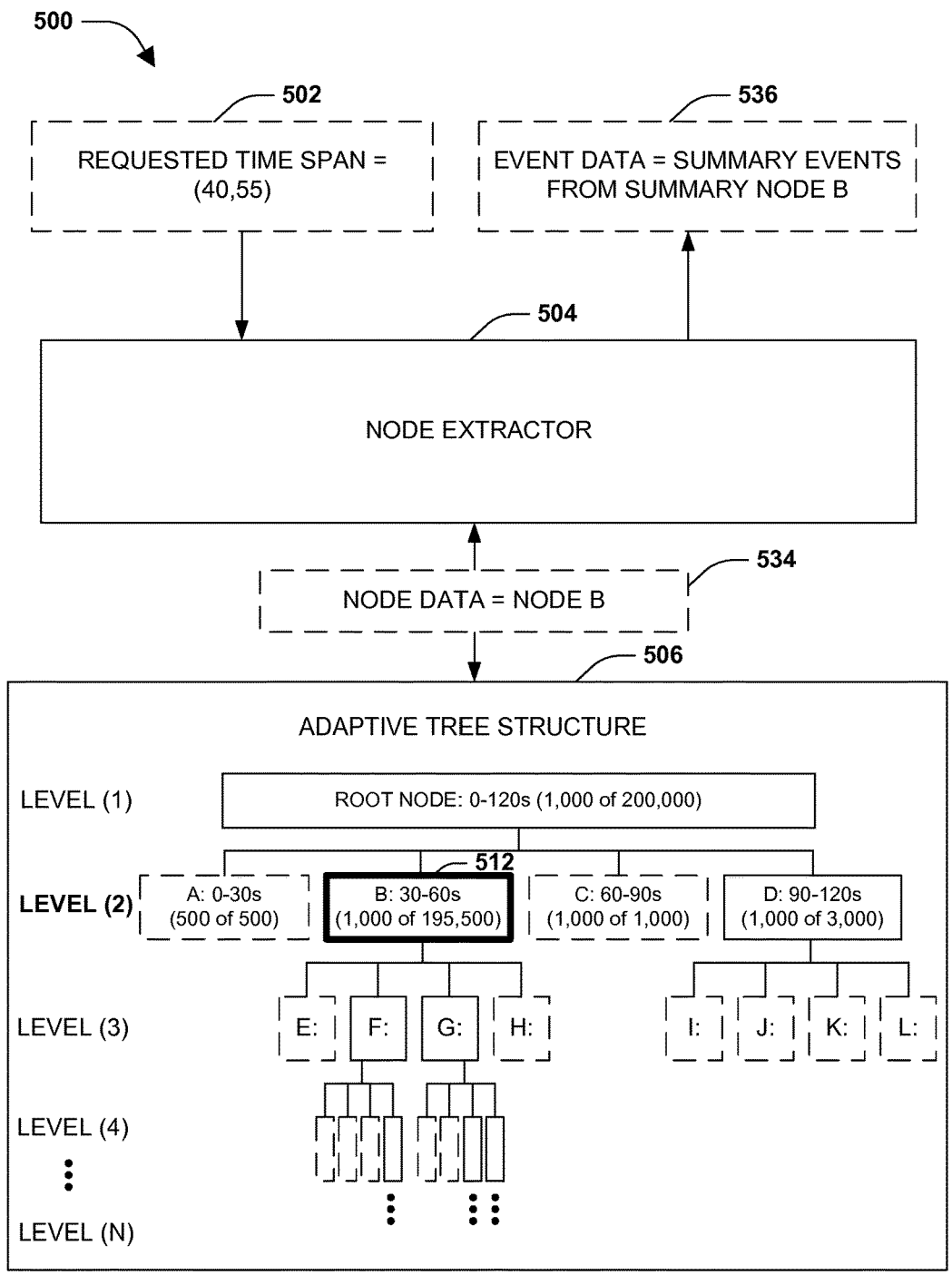
FIG. 5 is an illustration of an example of determining node data within an adaptive tree structure based upon a requested time span.

FIG. 5 illustrates an example 500 of determining node data 534 within an adaptive tree structure 506 based upon a requested time span 502. It may be appreciated that the adaptive tree structure 506 may correspond to the adaptive tree structure 406 of FIG. 4. A node extractor 504 may be configured to determine node data 534 within the adaptive tree structure 506 based upon the requested time span 502 of 40-55 seconds. In one example, the node data 534 may be used as event data 536 to populate a timeline with events corresponding to the requested time span 502 of 40-55 seconds.

In one example, the node extractor 504 may use the requested time span 502 of 40-55 seconds to determine one or two nodes within the adaptive tree structure 506 as comprising the node data 534. For example, the node extractor 504 may determine a level (L)=2 based upon $$\frac{T}{CPNL^L} < \text{requested time span} \leq \frac{T}{CPNL^{L-1}},$$

where T=120 seconds (total time of an event dataset) and CPNL=4 (predetermined number of child nodes for a summary node). That is, $\{120/4^L\}<15<=\{120/4^{L-1}\}$ is satisfied where level (L)=2 because 7.5<15<=30. Within level 2, the node extractor 504 may determine that the requested time span 502 of 40-55 seconds falls completely within node B's time span of 30-60 seconds. Thus, node extractor 504 may determine node B 512 as comprising the node data 534. Because node B 512 is a summary node comprising summary events (e.g., 1,000 summary events derived from 195,500 raw events within the event dataset covered by node B's time span of 30-60 seconds), the 1,000 summary events of node B 512 may be stored within the node data 534. In this way, the node data 534 may be used as event data 536 comprising summary events from node B 512 when populating the timeline based upon the requested time span 502 of 40-55 seconds.

Figure 6:
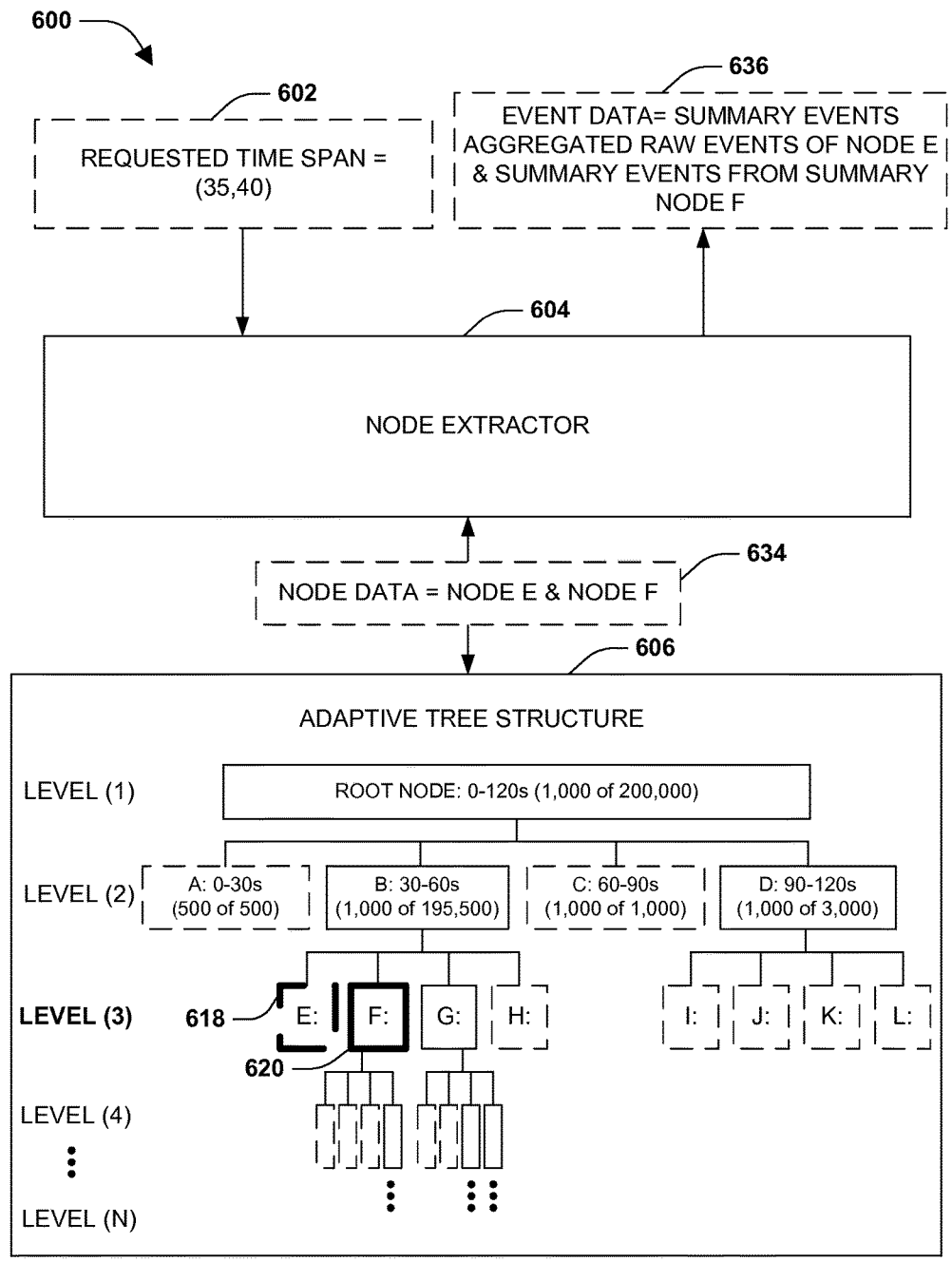
FIG. 6 is an illustration of an example of determining node data within an adaptive tree structure based upon a requested time span.

FIG. 6 illustrates an example 600 of determining node data 634 within an adaptive tree structure 606 based upon a requested time span 602. It may be appreciated that the adaptive tree structure 606 may correspond to the adaptive tree structure 406 of FIG. 4. A node extractor 604 may be configured to determine node data 634 within the adaptive tree structure 606 based upon the requested time span 602 of 35-40 seconds. In one example, the node data 634 may be used as event data 636 to populate a timeline with events correspond to the requested time span 602 of 35-40 seconds.

In one example, the node extractor 604 may use the requested time span 602 of 35-40 seconds to determine one or two nodes within the adaptive tree structure 606 as comprising the node data 634. For example, the node extractor 604 may determine a level (L)=3 based upon $$\frac{T}{CPNL^L} < \text{requested time span} \leq \frac{T}{CPNL^{L-1}},$$

where T=120 seconds (total time of an event dataset) and CPNL=4 (predetermined number of child nodes for a summary node). That is, $\{120/4^L\}<5<=\{120/4^{L-1}\}$ is satisfied where level (L)=3 because 1.875<5<=7.5. Within level 3, the node extractor 604 may determine that the requested time span 602 of 35-40 seconds falls completely within two adjacent nodes, node E 618 and node F 620. In particular the requested time span 602 of 35-40 falls completely within a time span of 30-37.5 for node E 618 and a time span of 37.5-45 for node F 620. Thus, the node extractor 604 may determine node E 618 and node F 620 as comprising the node data 634. Because node E 618 is a raw node comprising raw events, the raw events may (or may not) be aggregated into summary events that may be stored within the node data 634. Because node F 620 is a summary node comprising summary events (e.g., 1,000 summary events derived from raw events within the event dataset covered by node E's time span of 30-37.5 seconds), the 1,000 summary events of node F 620 may be stored within the node data 634. In this way, the node data 634 may be used as event data 636 comprising summary events aggregated (or not) from raw events of node E 618 and summary events from node F 620 when populating the timeline based upon the requested time span 602 of 35-40 seconds.

Figure 7:
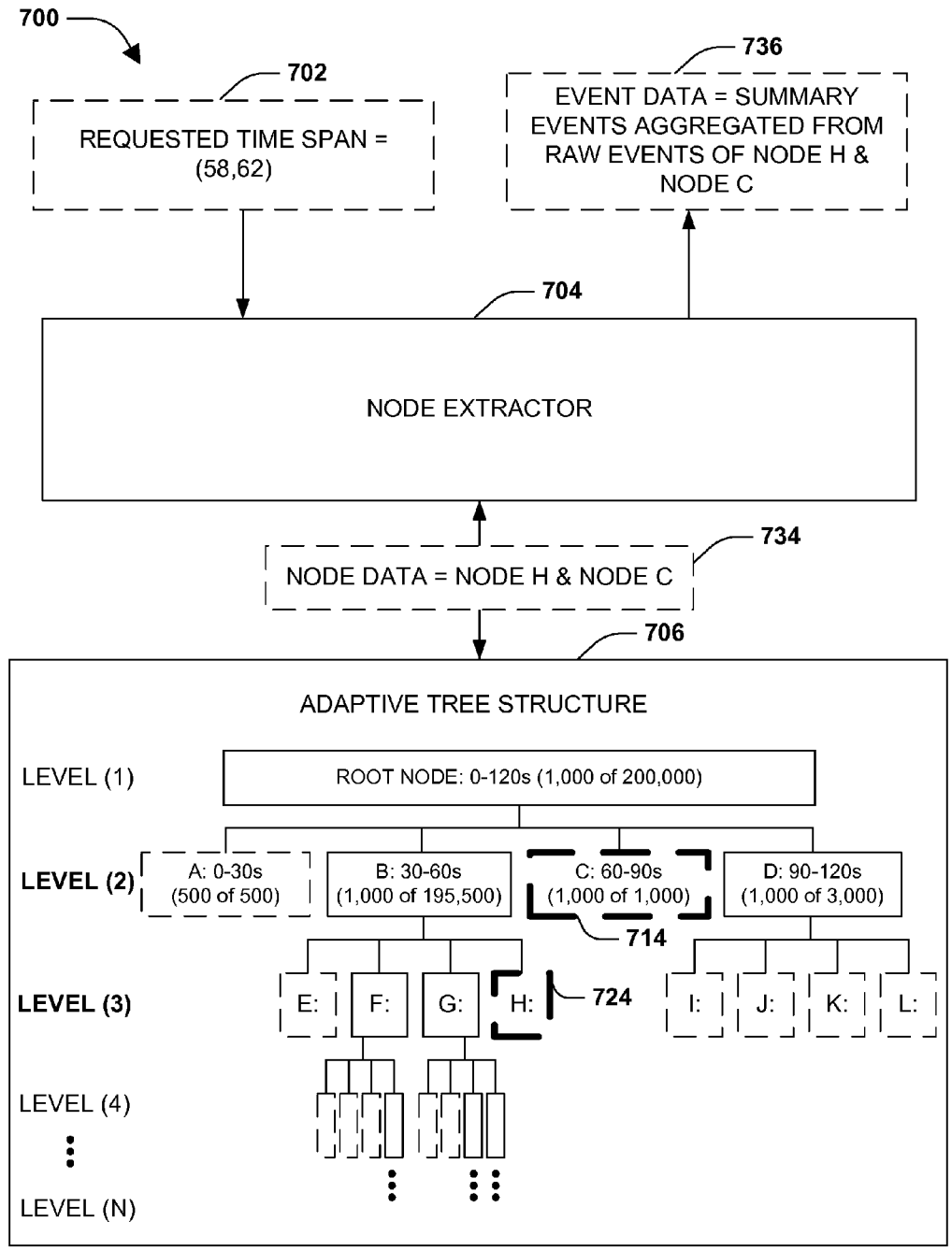
FIG. 7 is an illustration of an example of determining node data within an adaptive tree structure based upon a requested time span.

FIG. 7 illustrates an example 700 of determining node data 734 within an adaptive tree structure 706 based upon a requested time span 702. It may be appreciated that the adaptive tree structure 706 may correspond to the adaptive tree structure 406 of FIG. 4. A node extractor 704 may be configured to determine node data 734 within the adaptive tree structure 706 based upon the requested time span 702 of 58-62 seconds. In one example, the node data 734 may be used as event data 736 to populate a timeline with events corresponding to the requested time span 702 of 58-62 seconds.

In one example, the node extractor 704 may use the requested time span 702 of 58-62 seconds to determine one or two nodes within the adaptive tree structure 706 as comprising the node data 734. For example, the node extractor 704 may determine a level (L)=3 based upon $$\frac{T}{CPNL^L} < \text{requested time span} \leq \frac{T}{CPNL^{L-1}},$$

where T=120 seconds (total time of an event dataset) and CPNL=4 (predetermined number of child nodes for a summary node). That is, $\{120/4^L\}<4<=\{120/4^{L-1}\}$ is satisfied where level (L)=3 because 1.875<4<=7.5. Within level 3, the node extractor 704 may determine that a first segment 58-60 of the requested time span 702 falls within a first node, node H 724. However, the node extractor 704 may determine that a second segment 60-62 of the requested time span 702 does not fall within respective nodes of level 3 (e.g., the second segment 60-62 may not fall within respective time spans of node E, node F, and node G). The node extractor 704 may determine that the second segment 60-62 falls completely within node C 714 of level 2 (e.g., a previous level before level 3). Thus, the node extractor 704 may determine node H 724 of level 3 and node C 714 of level 2 as comprising node data 734. Because node H 724 is a raw node comprising raw events, the raw events may (or may not) be aggregated into summary events that may be stored within the node data 734. Because node C 714 is a raw node comprising raw events, the raw events may (or may not) be aggregated into summary events that may be stored within the node data 734. In this way, the node data 734 may be used as event data 736 comprising summary events aggregated (or not) from raw events of node H 724 and summary events aggregated (or not) from raw events of node C 714 when populating the timeline based upon the requested time span 702 of 58-62 seconds.

Figure 8:
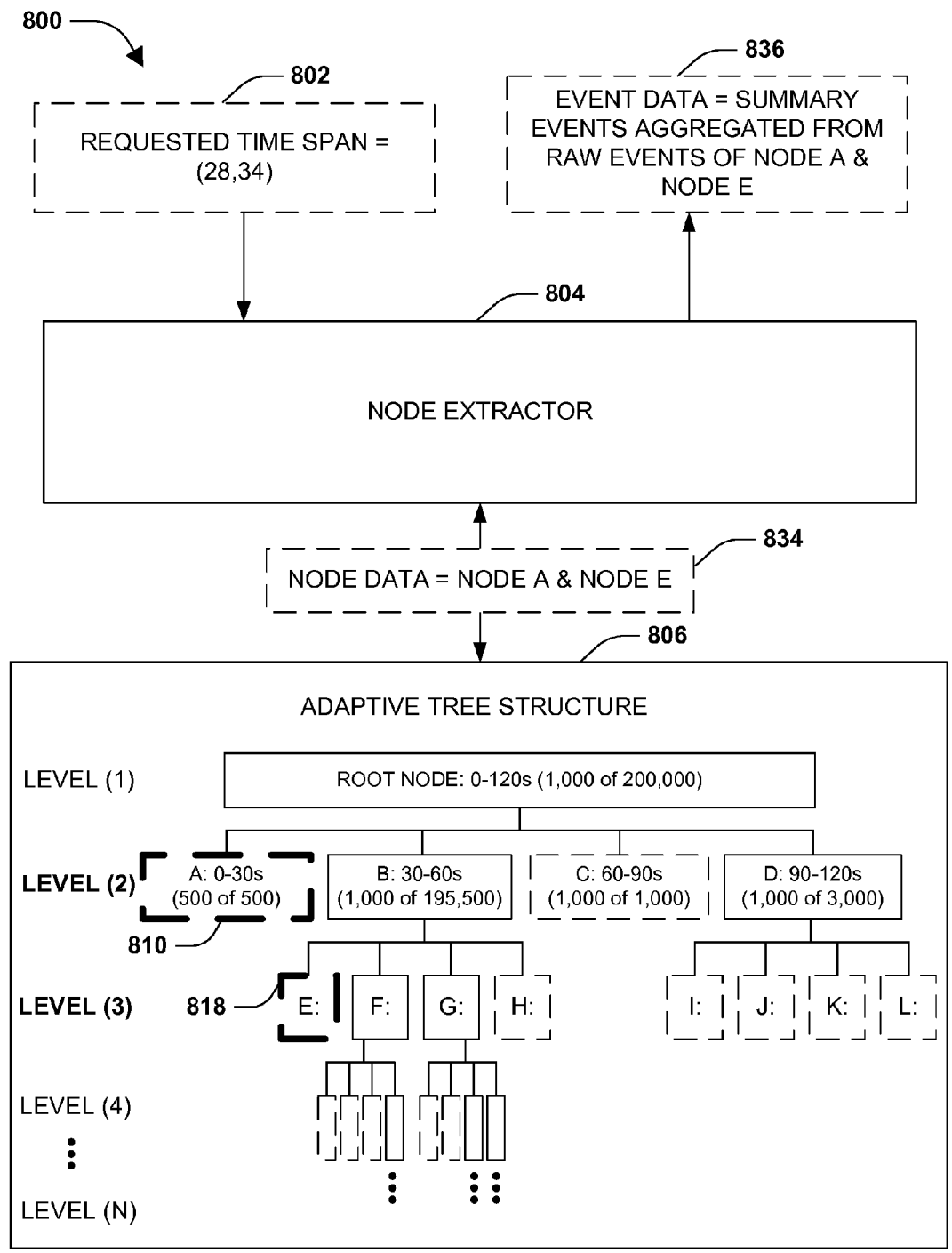
FIG. 8 is an illustration of an example of determining node data within an adaptive tree structure based upon a requested time span.

FIG. 8 illustrates an example 800 of determining node data 834 within an adaptive tree structure 806 based upon a requested time span 802. It may be appreciated that the adaptive tree structure 806 may correspond to the adaptive tree structure 406 of FIG. 4. A node extractor 804 may be configured to determine node data 834 within the adaptive tree structure 806 based upon the requested time span 802 of 28-34 seconds. In one example, the node data 834 may be used as event data 836 to populate a timeline with events corresponding to the requested time span 802 of 28-34 seconds.

In one example, the node extractor 804 may use the requested time span 802 of 28-34 seconds to determine one or two nodes within the adaptive tree structure 806 as comprising the node data 834. For example, the node extractor 804 may determine a level (L)=3 based upon $$\frac{T}{CPNL^L} < \text{requested time span} \leq \frac{T}{CPNL^{L-1}},$$

where T=120 seconds (total time of an event dataset) and CPNL=4 (predetermined number of child nodes for a summary node). That is, $\{120/4^L\}<6<=\{120/4^{L-1}\}$ is satisfied where level (L)=3 because 1.875<6<=7.5. Within level 3, the node extractor 804 may determine that a first segment 30-34 of the requested time span 802 falls within a first node, node E 818. However, the node extractor 804 may determine that a first segment 28-30 of the requested time span 802 does not fall within respective nodes of level 3 (e.g., the first segment 28-30 may not fall within respective time spans of node F, node G, and node H). The node extractor 804 may determine that the first segment 28-30 falls completely within node A 810 of level 2 (e.g., a previous level before level 3). Thus, the node extractor 804 may determine node E 818 of level 3 and node A 810 of level 2 as comprising node data 834. Because node E 818 is a raw node comprising raw events, the raw events may (or may not) be aggregated into summary events that may be stored within the node data 834. Because node A 810 is a raw node comprising raw events, the raw events may (or may not) be aggregated into summary events that may be stored within the node data 834. In this way, the node data 834 may be used as event data 836 comprising summary events aggregated (or not) from raw events of node E 818 and summary events aggregated (or not) from raw events of node A 810 when populating the timeline based upon the requested time span 802 of 28-34 seconds.

Figure 9:
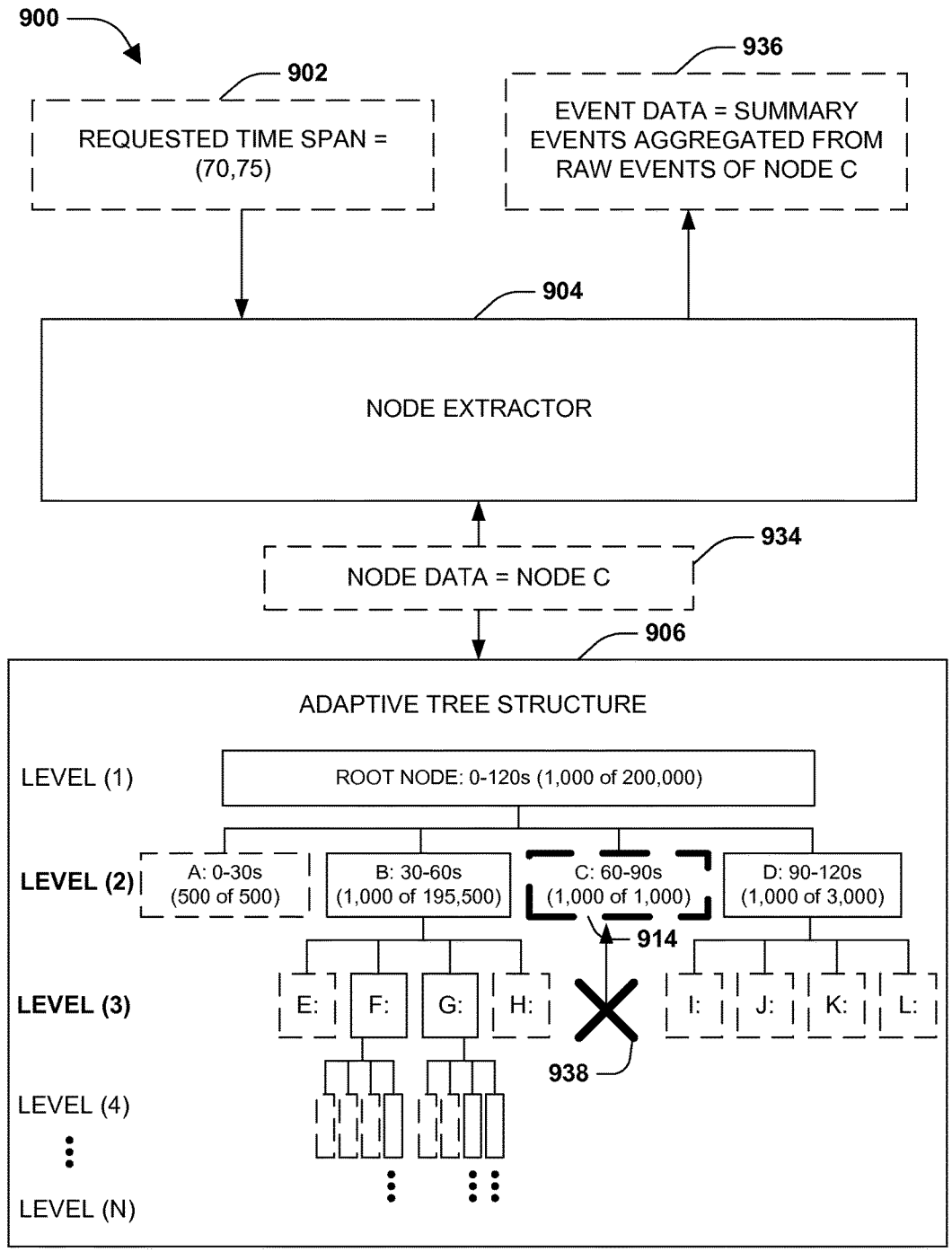
FIG. 9 is an illustration of an example of determining node data within an adaptive tree structure based upon a requested time span.

FIG. 9 illustrates an example 900 of determining node data 934 within an adaptive tree structure 906 based upon a requested time span 902. It may be appreciated that the adaptive tree structure 906 may correspond to the adaptive tree structure 406 of FIG. 4. A node extractor 904 may be configured to determine node data 934 within the adaptive tree structure 906 based upon the requested time span 902 of 70-75 seconds. In one example, the node data 934 may be used as event data 936 to populate a timeline with events corresponding to the requested time span 902 of 70-75 seconds.

In one example, the node extractor 904 may use the requested time span 902 of 70-75 seconds to determine one or two nodes within the adaptive tree structure 906 as comprising the node data 934. For example, the node extractor 904 may determine a level (L)=3 based upon $$\frac{T}{CPNL^L} < \text{requested time span} \leq \frac{T}{CPNL^{L-1}},$$

where T=120 seconds (total time of an event dataset) and CPNL=4 (predetermined number of child nodes for a summary node). That is, $\{120/4^L\}<5<=\{120/4^{L-1}\}$ is satisfied where level (L)=3 because 1.875<5<=7.5. Within level 3, the node extractor 904 may determine 938 that none of level 3's nodes span at least a portion of the requested time span 902 of 70-75 seconds. The node extractor 904 may decrement level (L) to 2, and may determine node data 934 using level (L)=2. Within level 2, the node extractor 904 may determine that the requested time span 902 of 70-75 seconds falls completely within node C's time span of 60-90 seconds. Thus, node extractor 904 may determine node C 914 as comprising the node data 934. Because node C 914 is a raw node comprising raw events, the raw events may (or may not) be aggregated into summary events that may be stored within the node data 934. In this way, the node data 934 may be used as event data 936 comprising summary events aggregated (or not) from raw events of node C 914 when populating the timeline based upon the requested time span 902 of 70-75 seconds.

Figure 10:
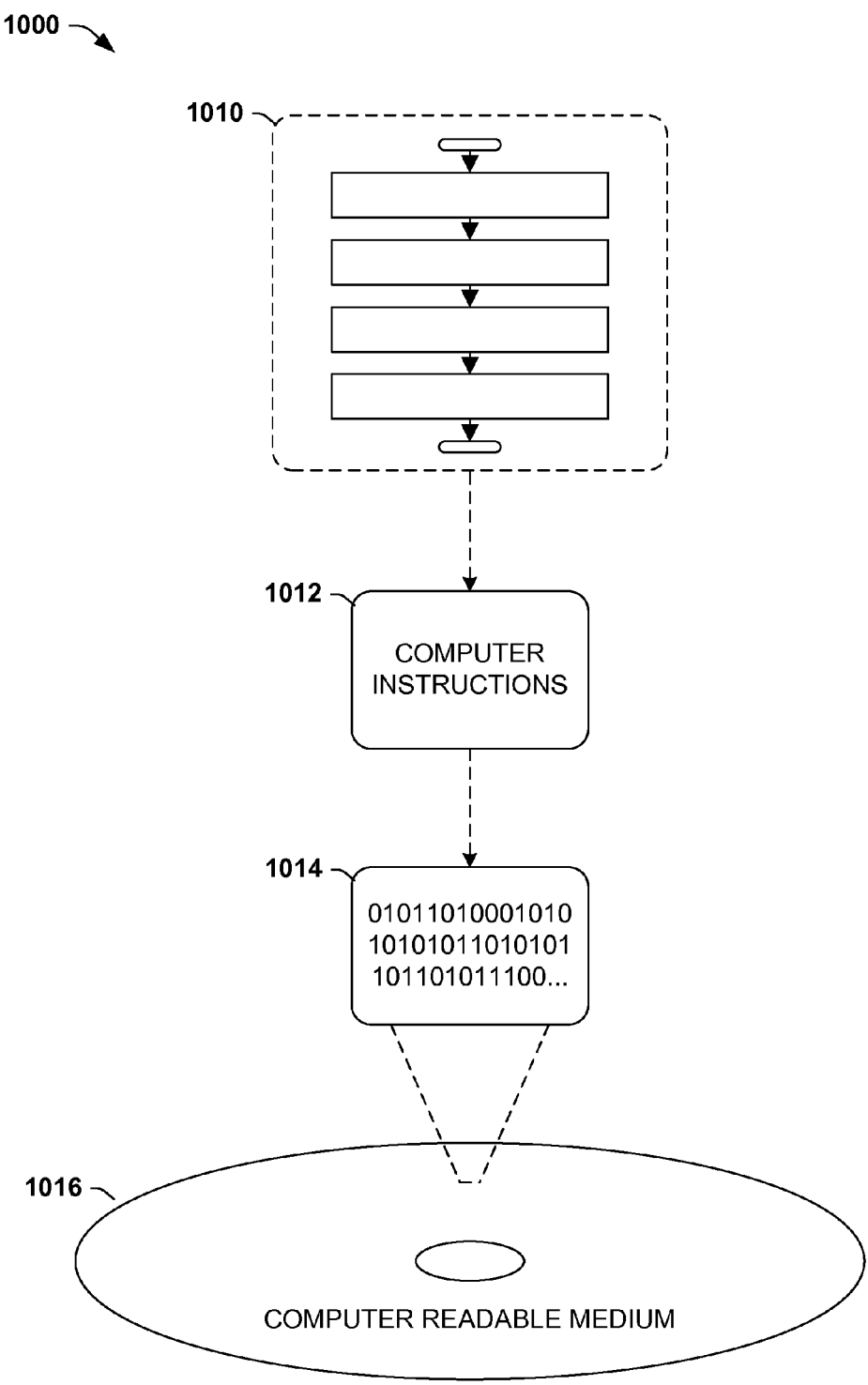
FIG. 10 is an illustration of an exemplary computer-readable medium wherein processor-executable instructions configured to embody one or more of the provisions set forth herein may be comprised.

Still another embodiment involves a computer-readable medium comprising processor-executable instructions configured to implement one or more of the techniques presented herein. An exemplary computer-readable medium that may be devised in these ways is illustrated in FIG. 10, wherein the implementation 1000 comprises a computer-readable medium 1016 (e.g., a CD-R, DVD-R, or a platter of a hard disk drive), on which is encoded computer-readable data 1014. This computer-readable data 1014 in turn comprises a set of computer instructions 1012 configured to operate according to one or more of the principles set forth herein. In one such embodiment 1000, the processor-executable computer instructions 1012 may be configured to perform a method 1010, such as at least some of the exemplary method 100 of FIG. 1 and/or at least some of exemplary method 200 of FIG. 2, for example. In another such embodiment, the processor-executable instructions 1012 may be configured to implement a system, such as at least some of the exemplary system 300 of FIG. 3, for example. Many such computer-readable media may be devised by those of ordinary skill in the art that are configured to operate in accordance with the techniques presented herein.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

As used in this application, the terms "component," "module," "system", "interface", and the like are generally intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a controller and the controller can be a component. One or more components may reside within a process and/or thread of execution and a component may be localized on one computer and/or distributed between two or more computers.

Furthermore, the claimed subject matter may be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, carrier, or media. Of course, those skilled in the art will recognize many modifications may be made to this configuration without departing from the scope or spirit of the claimed subject matter.

FIG. 9 and the following discussion provide a brief, general description of a suitable computing environment to implement embodiments of one or more of the provisions set forth herein. The operating environment of FIG. 9 is only one example of a suitable operating environment and is not intended to suggest any limitation as to the scope of use or functionality of the operating environment. Example computing devices include, but are not limited to, personal computers, server computers, hand-held or laptop devices, mobile devices (such as mobile phones, Personal Digital Assistants (PDAs), media players, and the like), multiprocessor systems, consumer electronics, mini computers, mainframe computers, distributed computing environments that include any of the above systems or devices, and the like.

Although not required, embodiments are described in the general context of "computer readable instructions" being executed by one or more computing devices. Computer readable instructions may be distributed via computer readable media (discussed below). Computer readable instructions may be implemented as program modules, such as functions, objects, Application Programming Interfaces (APIs), data structures, and the like, that perform particular tasks or implement particular abstract data types. Typically, the functionality of the computer readable instructions may be combined or distributed as desired in various environments.

Figure 11:
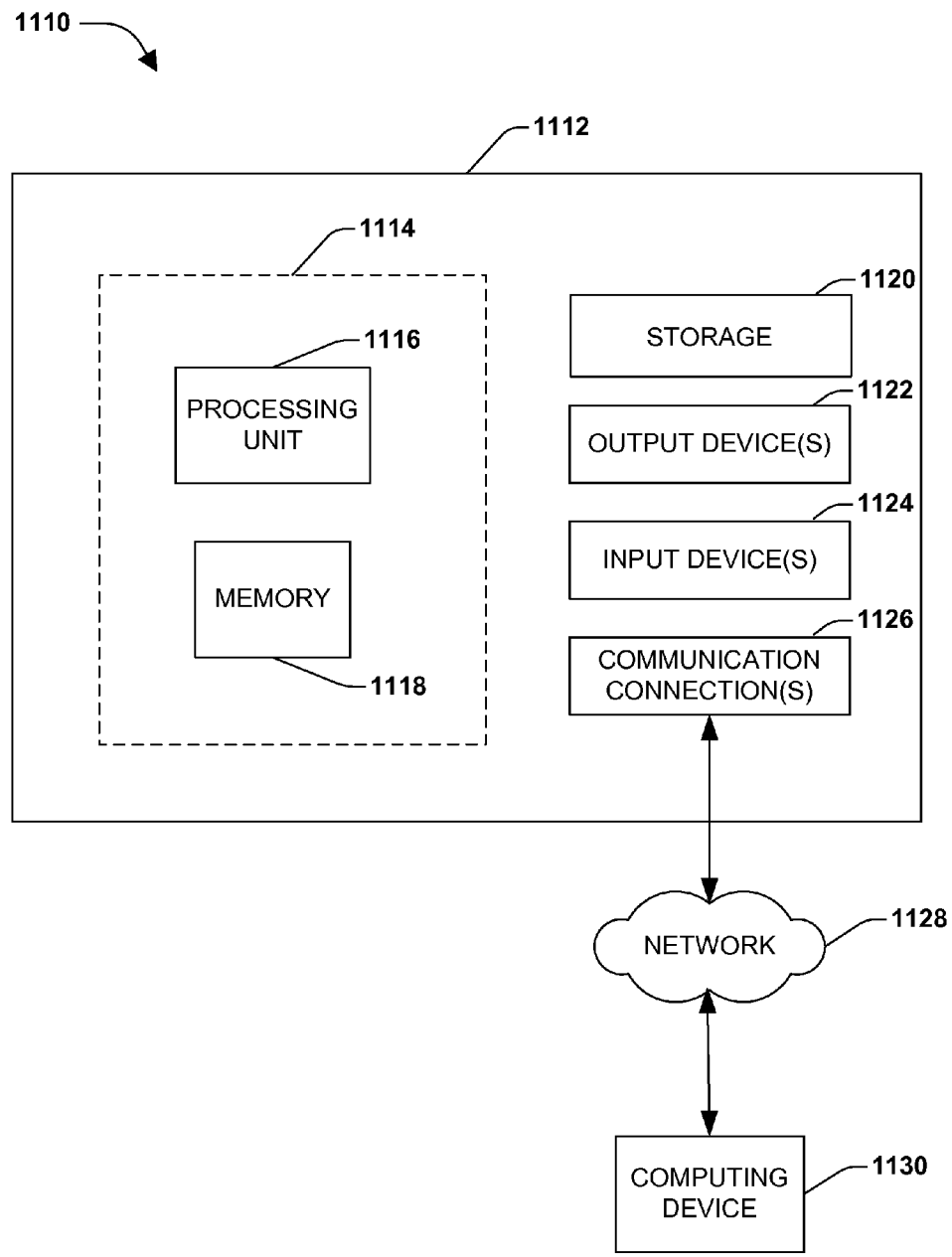
FIG. 11 illustrates an exemplary computing environment wherein one or more of the provisions set forth herein may be implemented.

FIG. 11 illustrates an example of a system 1110 comprising a computing device 1112 configured to implement one or more embodiments provided herein. In one configuration, computing device 1112 includes at least one processing unit 1116 and memory 1118. Depending on the exact configuration and type of computing device, memory 1118 may be volatile (such as RAM, for example), non-volatile (such as ROM, flash memory, etc., for example) or some combination of the two. This configuration is illustrated in FIG. 11 by dashed line 1114.

In other embodiments, device 1112 may include additional features and/or functionality. For example, device 1112 may also include additional storage (e.g., removable and/or non-removable) including, but not limited to, magnetic storage, optical storage, and the like. Such additional storage is illustrated in FIG. 11 by storage 1120. In one embodiment, computer readable instructions to implement one or more embodiments provided herein may be in storage 1120. Storage 1120 may also store other computer readable instructions to implement an operating system, an application program, and the like. Computer readable instructions may be loaded in memory 1118 for execution by processing unit 1116, for example.

The term "computer readable media" as used herein includes computer storage media. Computer storage media includes volatile and nonvolatile, removable and non-removable media implemented in any method or technology for storage of information such as computer readable instructions or other data. Memory 1118 and storage 1120 are examples of computer storage media. Computer storage media includes, but is not limited to, RAM, ROM, EEPROM, flash memory or other memory technology, CD-ROM, Digital Versatile Disks (DVDs) or other optical storage, magnetic cassettes, magnetic tape, magnetic disk storage or other magnetic storage devices, or any other medium which can be used to store the desired information and which can be accessed by device 1112. Any such computer storage media may be part of device 1112.

Device 1112 may also include communication connection(s) 1126 that allows device 1112 to communicate with other devices. Communication connection(s) 1126 may include, but is not limited to, a modem, a Network Interface Card (NIC), an integrated network interface, a radio frequency transmitter/receiver, an infrared port, a USB connection, or other interfaces for connecting computing device 1112 to other computing devices. Communication connection(s) 1126 may include a wired connection or a wireless connection. Communication connection(s) 1126 may transmit and/or receive communication media.

The term "computer readable media" may include communication media. Communication media typically embodies computer readable instructions or other data in a "modulated data signal" such as a carrier wave or other transport mechanism and includes any information delivery media. The term "modulated data signal" may include a signal that has one or more of its characteristics set or changed in such a manner as to encode information in the signal.

Device 1112 may include input device(s) 1124 such as keyboard, mouse, pen, voice input device, touch input device, infrared cameras, video input devices, and/or any other input device. Output device(s) 1122 such as one or more displays, speakers, printers, and/or any other output device may also be included in device 1112. Input device(s) 1124 and output device(s) 1122 may be connected to device 1112 via a wired connection, wireless connection, or any combination thereof. In one embodiment, an input device or an output device from another computing device may be used as input device(s) 1124 or output device(s) 1122 for computing device 1112.

Components of computing device 1112 may be connected by various interconnects, such as a bus. Such interconnects may include a Peripheral Component Interconnect (PCI), such as PCI Express, a Universal Serial Bus (USB), firewire (IEEE 1394), an optical bus structure, and the like. In another embodiment, components of computing device 1112 may be interconnected by a network. For example, memory 1118 may be comprised of multiple physical memory units located in different physical locations interconnected by a network.

Those skilled in the art will realize that storage devices utilized to store computer readable instructions may be distributed across a network. For example, a computing device 1130 accessible via a network 1128 may store computer readable instructions to implement one or more embodiments provided herein. Computing device 1112 may access computing device 1130 and download a part or all of the computer readable instructions for execution. Alternatively, computing device 1112 may download pieces of the computer readable instructions, as needed, or some instructions may be executed at computing device 1112 and some at computing device 1130.

Various operations of embodiments are provided herein. In one embodiment, one or more of the operations described may constitute computer readable instructions stored on one or more computer readable media, which if executed by a computing device, will cause the computing device to perform the operations described. The order in which some or all of the operations are described should not be construed as to imply that these operations are necessarily order dependent. Alternative ordering will be appreciated by one skilled in the art having the benefit of this description. Further, it will be understood that not all operations are necessarily present in each embodiment provided herein.

Moreover, the word "exemplary" is used herein to mean serving as an example, instance, or illustration. Any aspect or design described herein as "exemplary" is not necessarily to be construed as advantageous over other aspects or designs. Rather, use of the word exemplary is intended to present concepts in a concrete fashion. As used in this application, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims may generally be construed to mean "one or more" unless specified otherwise or clear from context to be directed to a singular form.

Also, although the disclosure has been shown and described with respect to one or more implementations, equivalent alterations and modifications will occur to others skilled in the art based upon a reading and understanding of this specification and the annexed drawings. The disclosure includes all such modifications and alterations and is limited only by the scope of the following claims. In particular regard to the various functions performed by the above described components (e.g., elements, resources, etc.), the terms used to describe such components are intended to correspond, unless otherwise indicated, to any component which performs the specified function of the described component (e.g., that is functionally equivalent), even though not structurally equivalent to the disclosed structure which performs the function in the herein illustrated exemplary implementations of the disclosure. In addition, while a particular feature of the disclosure may have been disclosed with respect to only one of several implementations, such feature may be combined with one or more other features of the other implementations as may be desired and advantageous for any given or particular application. Furthermore, to the extent that the terms "includes", "having", "has", "with", or variants thereof are used in either the detailed description or the claims, such terms are intended to be inclusive in a manner similar to the term "comprising."

What is claimed is:

1. A method, comprising:
    receiving a requested time span;
    calculating, via a processing unit, a level (L) corresponding to:

$$\frac{T}{CPNL^L} < \text{requested time span} \le \frac{T}{CPNL^{L-1}},$$

where T is a total time span of an event dataset and CPNL is a predetermined number of child nodes per summary node, the requested time span less than or equal to the total time span, CPNL comprising a non-zero number other than one, T comprising a non-zero number;
    determining node data within an adaptive tree structure corresponding to the requested time span based upon the level; and
    presenting a visualization of event data represented by the node data within an interactive timeline of a user interface.

2. The method of claim 1, comprising populating the visualization based upon the node data.

3. The method of claim 1, comprising:
    if the node data corresponds to a raw node, then:
        aggregating raw events of the raw node into summary events; and
        storing the summary events within the node data.

4. The method of claim 1, the node data comprising data associated with at least one of a document or a spreadsheet.

5. The method of claim 1, the node data comprising data associated with network traffic.

6. The method of claim 1, the node data comprising data associated with a social network.

7. A system, comprising:
    one or more processing units; and
    memory comprising instructions that when executed by at least one of the one or more processing units, perform a method comprising:
        receiving a requested time span;
        calculating a level (L) corresponding to:

$$\frac{T}{CPNL^L} < \text{requested time span} \le \frac{T}{CPNL^{L-1}},$$

where T is a total time span of an event dataset and CPNL is a predetermined number of child nodes per summary node, the requested time span less than or equal to the total time span;
        determining node data within an adaptive tree structure corresponding to the requested time span based upon the level; and
        presenting a visualization of event data represented by the node data within an interactive timeline of a user interface.

8. The system of claim 7, the method comprising:
    if the node data corresponds to a raw node, then:
        aggregating raw events of the raw node into summary events.

9. The system of claim 8, at least one summary event indicative of two or more raw events.

10. The system of claim 7, CPNL comprising a non-zero number other than one.

11. The system of claim 10, T comprising a non-zero number.

12. The system of claim 7, the node data associated with at least one of a document, a spreadsheet, network traffic or a social network.

13. A computer readable storage memory comprising instructions that when executed by at least one processing unit, perform a method, comprising:
   receiving a requested time span;
   calculating a level (L) corresponding to:

$$\frac{T}{CPNL^L} < \text{requested time span} \leq \frac{T}{CPNL^{L-1}},$$

where T is a total time span of an event dataset and CPNL is a predetermined number of child nodes per summary node, the requested time span less than or equal to the total time span, CPNL comprising a non-zero number other than one, T comprising a non-zero number;
   determining node data within an adaptive tree structure corresponding to the requested time span based upon the level; and
   presenting a visualization of event data represented by the node data within an interactive timeline of a user interface.

14. The computer readable storage memory of claim 13, the method comprising:
   if the node data corresponds to a raw node, then:
      aggregating raw events of the raw node into summary events; and
      storing the summary events within the node data.

15. The computer readable storage memory of claim 13, the node data comprising data associated with at least one of a document or a spreadsheet.

16. The computer readable storage memory of claim 13, the node data comprising data associated with network traffic.

* * * * *